United States Patent
Shishihara

(10) Patent No.: US 9,933,016 B2
(45) Date of Patent: Apr. 3, 2018

(54) ROLLING BEARING DEVICE

(71) Applicant: JTEKT CORPORATION, Osaka-shi, Osaka (JP)

(72) Inventor: Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 59 days.

(21) Appl. No.: 14/683,495

(22) Filed: Apr. 10, 2015

(65) Prior Publication Data

US 2015/0292560 A1   Oct. 15, 2015

(30) Foreign Application Priority Data

Apr. 15, 2014  (JP) ................................ 2014-083779
Apr. 18, 2014  (JP) ................................ 2014-086725
Apr. 18, 2014  (JP) ................................ 2014-086726

(51) Int. Cl.
*F16C 33/66* (2006.01)
*F16C 35/06* (2006.01)
*F16C 19/06* (2006.01)
*F16C 19/16* (2006.01)

(52) U.S. Cl.
CPC .......... *F16C 35/06* (2013.01); *F16C 33/6607* (2013.01); *F16C 19/06* (2013.01);
(Continued)

(58) Field of Classification Search
CPC .............. F16C 33/6607; F16C 33/6614; F16C 33/6618; F16C 33/6629
See application file for complete search history.

(56) References Cited

U.S. PATENT DOCUMENTS 4,082,381 A * 4/1978 Simmons ............ F16C 33/6607
                                              384/472
5,001,377 A * 3/1991 Parkinson ........... F16C 33/6607
                                              310/90
(Continued)

FOREIGN PATENT DOCUMENTS

JP     S56-092462 U    7/1981
JP     S57-157818 A    9/1982
(Continued)

OTHER PUBLICATIONS

Jan. 10, 2018 Office Action issued in Japanese Patent Application No. 2014-083779.
(Continued)

*Primary Examiner* — Thomas R Hannon
(74) *Attorney, Agent, or Firm* — Oliff PLC

(57) ABSTRACT

A rolling bearing device includes a rolling bearing; and a spacer provided adjacent to one side of the rolling bearing in an axial direction and having a grease reservoir and a flow path, the grease reservoir being in a form of a groove, extending along a circumferential direction, and having grease reserved in the grease reservoir, and the flow path providing communication between the grease reservoir and an inner part of the rolling bearing. The spacer includes an annular wall surface that defines an inner periphery of the grease reservoir. An end of the annular wall surface on a side of the rolling bearing in the axial direction of the grease reservoir is continuous with an opposed end face of the spacer that is opposed to the rolling bearing. An entire area of the annular wall surface is constituted by a flat surface.

8 Claims, 13 Drawing Sheets

(52) U.S. Cl.
CPC ........ *F16C 19/163* (2013.01); *F16C 33/6618* (2013.01); *F16C 2322/39* (2013.01)

(56) References Cited

U.S. PATENT DOCUMENTS

| | | | | |
|---|---|---|---|---|
| 5,102,240 | A | * | 4/1992 | Oehy .................. D01H 7/042 384/465 |
| 6,854,892 | B2 | * | 2/2005 | Lauck .................. F16C 19/06 384/462 |
| 7,267,489 | B2 | * | 9/2007 | Kosugi .................. F16C 19/54 384/494 |
| 2010/0327686 | A1 | | 12/2010 | Gardelle et al. |
| 2011/0206306 | A1 | | 8/2011 | Urano |
| 2015/0043853 | A1 | | 2/2015 | Shishihara |

FOREIGN PATENT DOCUMENTS

| | | | |
|---|---|---|---|
| JP | H08-200379 | A | 8/1996 |
| JP | 2005180629 | A | 7/2005 |
| JP | 2007-333016 | A | 12/2007 |
| JP | 2011-503461 | A | 1/2011 |
| JP | 2012-072851 | A | 4/2012 |
| WO | 2010010897 | A1 | 1/2010 |

OTHER PUBLICATIONS

Jan. 25, 2018 Office Action issued in Japanese Patent Application No. 2014-086725.
Jan. 25, 2018 Office Action issued in Japanese Patent Application No. 2014-086726.

\* cited by examiner

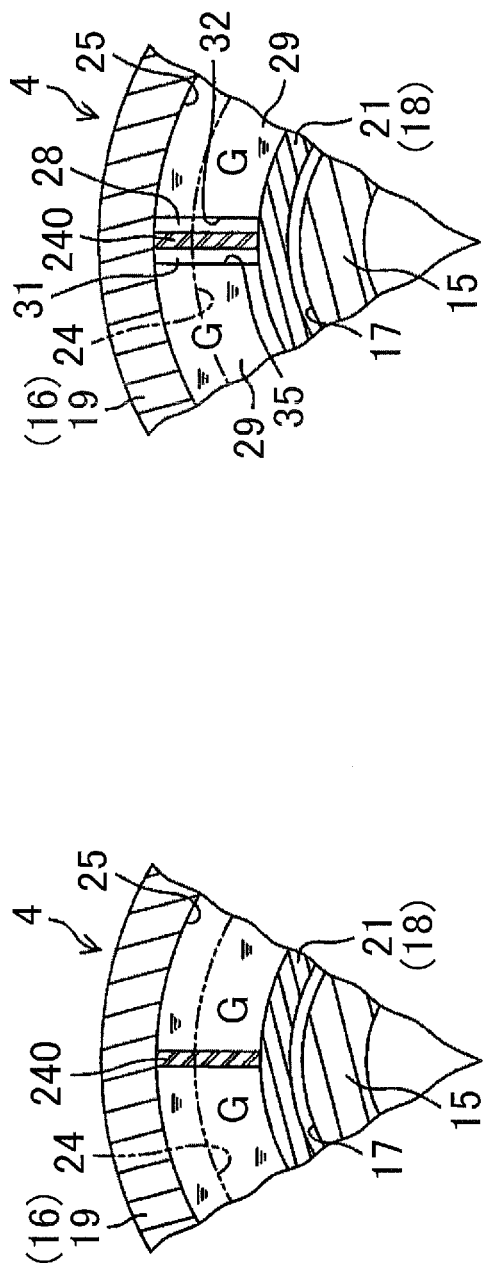

ROLLING BEARING DEVICE

INCORPORATION BY REFERENCE

The disclosure of Japanese Patent Applications No. 2014-083779, 2014-086725 and 2014-086726 filed on Apr. 15, 2014, Apr. 18, 2015 and Apr. 18, 2015 including the specifications, drawings and abstracts is incorporated herein by reference in its entirety.

BACKGROUND OF THE INVENTION

1. Field of the Invention

The invention relates to a rolling bearing device.

2. Description of Related Art

As a lubrication system for rolling bearing devices, grease lubrication has been widely used. In order to maintain lubrication performance even under severe lubrication conditions such as high temperatures, high-speed rotations, and high loads, a grease reservoir is provided in the outer ring spacer for a bearing and a base oil contained in grease reserved in the grease reservoir is supplied into the bearing. Rolling bearing devices having such a type of mechanism are described, for example, in WO 2010/010897 and Japanese Patent Application Publication No. 2005-180629 (JP 2005-180629 A).

WO 2010/010897 describes a rolling bearing device including an inner ring, an outer ring, a plurality of balls that serves as rolling elements interposed between the inner and outer rings, a cage that holds the plurality of balls at given intervals in the circumferential direction thereof, a seal that seals one end of the annular space between the inner and outer rings in the axial direction, and an annular grease reservoir member that has grease reserved therein and is provided so as to be close to an annular groove adjacent to the guide face of the outer ring that guides the rotation of the cage.

JP 2005-180629 A describes a rolling bearing including an inner ring, an outer ring, a plurality of rolling elements interposed between the raceway surfaces of the inner and outer rings, a grease reservoir formation part that is provided in contact with the outer ring, and a gap formation piece that provides communication between a grease reservoir and the vicinity of the raceway surface of the outer ring such that a gap is formed along the inside face of the outer ring.

When the rolling bearing device of a grease inclusion type is continuously used, a breakage (gap) may occur near the communication path between a grease reservoir and a bearing, as a base oil contained in grease in the grease reservoir is supplied. When the breakage extends over an entire periphery in a circumferential direction, the supply of the base oil to a rolling bearing is stopped although the grease remains in the grease reservoir. In case that the supply of the base oil is stopped, the lubrication performance for the bearing is lost when the base oil in the rolling bearing is completely consumed. Therefore, it becomes difficult to use the rolling bearing device over a long time period.

Meanwhile, JP 2005-180629 A describes a technique in which the base oil of the grease is supplied to a position near the raceway surface of the outer ring with the structure in which the minute gap is formed between the outer ring and the gap formation piece, in order to maintain lubrication performance for the bearing over a longer time period. However, in the technology described in JP 2005-180629 A, it is necessary to accurately design the shape of the gap formation piece to form the minute gap. Therefore, the structure may be complicated.

SUMMARY OF THE INVENTION

The invention provides a rolling bearing device in which a base oil contained in grease is continuously supplied to a bearing over a long time period with a simple structure, whereby service life thereof is increased.

A first aspect of the invention relates to a rolling bearing device including: a rolling bearing including an inner ring, an outer ring, and a plurality of rolling elements arranged between the inner ring and the outer ring; and a spacer provided adjacent to one side of the rolling bearing in an axial direction and having a grease reservoir and a flow path, the grease reservoir being in a form of a groove, extending along a circumferential direction, and having grease reserved in the grease reservoir, and the flow path providing communication between the grease reservoir and an inner part of the rolling bearing. The spacer includes an annular wall surface that defines an inner periphery of the grease reservoir. An end of the annular wall surface on a side of the rolling bearing in the axial direction of the grease reservoir is continuous with an opposed end face of the spacer that is opposed to the rolling bearing. An entire area of the annular wall surface is constituted by a flat surface.

According to the above aspect of the invention, the annular wall surface is continuous with the opposed end face of the spacer that is opposed to the rolling bearing. In addition, the annular wall surface extends from the end of the grease reservoir on the side of the rolling bearing in the axial direction of the spacer to the side opposite to the rolling bearing in the axial direction of the spacer (the grease reservoir). Moreover, the entire area of the annular wall surface is constituted by the flat surface. The base oil contained in the grease of the grease reservoir moves in the grease reservoir to the flow path. Since the entire area of the annular wall surface is constituted by the flat surface, the base oil in the grease reservoir flows only in one direction along the annular wall surface. That is, variation in the flowing easiness of the base oil can be avoided in the grease reservoir. Accordingly, the occurrence of the breakage of the grease can be reduced or prevented effectively. Thus, the base oil contained in the grease can be continuously supplied to the rolling bearing over a long time period, which makes it possible to maintain the lubrication performance for the rolling bearing over a longer time period. In addition, since it is only necessary to form the entire area of the annular wall surface that defines the grease reservoir into the flat surface, the structure of the rolling bearing device can be prevented from becoming complicated.

In the above-mentioned aspect, the annular wall surface may include a cylindrical surface about an axis line of the spacer. The annular wall surface may include a conical surface about an axis line of the spacer, a diameter of the conical surface being reduced gradually toward the rolling bearing.

In the above-mentioned aspect, the inner periphery of the grease reservoir may have a linear shape in a sectional view of the spacer in the axial direction, and a radial-size of the grease reservoir on the side of the rolling bearing in the axial direction of the spacer may be same as or larger than a radial-size of the grease reservoir on a side opposite to the rolling bearing in the axial direction of the spacer.

In the above-mentioned aspect, inner wall surfaces that define the grease reservoir may be subjected to non-viscous surface treatment.

According to the above configurations, the inner wall surfaces are subjected to the non-viscous surface treatment. Therefore, adhesion forces are hardly generated or only relatively weak adhesion forces are generated at the boundaries between the grease and the inner wall surfaces. Accordingly, when separation forces for separating the grease from the inner wall surfaces are locally generated in the grease, the grease is entirely separated from the wall surfaces. That is, since the inner wall surfaces are subjected to the non-viscous surface treatment, the adhesion forces generated in the grease are not so large as to cause the occurrence of the breakage of the grease. Therefore, the occurrence of the breakage of the grease can be prevented or reduced. Thus, the base oil contained in the grease can be continuously supplied to the rolling bearing over a long time period, which makes it possible to maintain the lubrication performance for the rolling bearing over a longer time period. In addition, since it is only necessary to provide the inner wall surfaces subjected to the non-viscous surface treatment, the structure of the rolling bearing device can be prevented from becoming complicated.

In the above-mentioned aspect, the inner wall surfaces may include a back-side wall surface that is located on a back side when seen from the flow path. The non-viscous surface treatment may include treatment in which one of a fluorine-based non-viscous resin layer and a silicon-based non-viscous resin layer is disposed on the inner wall surfaces.

According to the above configuration, the back-side wall surface on the back side when seen from the side of the flow path is subjected to the non-viscous surface treatment. The adhesion force that is generated when the grease adheres onto the back-side wall surface has the greatest impact on the breakage of the grease in the grease reservoir. Therefore, at least the back-side wall surface is desirably subjected to the non-viscous surface treatment. According to the above configuration, since it is only necessary to dispose one of the fluorine-based non-viscous resin layer and the silicon-based non-viscous resin layer on the inner wall surfaces, the structure of the rolling bearing device can be further prevented from becoming complicated.

In the above-mentioned aspect, the non-viscous surface treatment may be treatment in which the inner wall surfaces are coated with a predetermined kind of oil immiscible with a base oil of the grease.

According to the above configuration, since it is only necessary to coat the inner wall surfaces with the oil, the structure of the rolling bearing device can be further prevented from becoming complicated A second aspect of the invention relates to a rolling bearing device including: a rolling bearing including an inner ring, an outer ring, and a plurality of rolling elements arranged between the inner ring and the outer ring; and a spacer provided adjacent to one side of the rolling bearing in an axial direction and having a grease reservoir, a plurality of partition walls, and a flow path, the grease reservoir being in a form of a groove, extending along a circumferential direction, and having grease reserved in the grease reservoir, the plurality of partition walls partitioning the grease reservoir into a plurality of accommodation chambers in the circumferential direction, and the flow path providing communication between the accommodation chambers and an inner part of the rolling bearing.

According to the above configuration, the grease is accommodated in each of the plurality of accommodation chambers defined by the partition walls. The grease in the adjacent accommodation chambers is divided by the partition walls. Therefore, even if the breakage of the grease occurs in one of the accommodation chambers, the diffusion of the breakage of the grease is ended by the accommodation chamber involved. Thus, the breakage of the grease can be stopped at the accommodation chamber. As a result, the accommodation chambers adjacent to the accommodation chamber involved are not influenced by the breakage of the grease and the base oil of the grease can be continuously supplied. Accordingly, even if the breakage of the grease occurs, the base oil can be continuously supplied to the rolling bearing. In addition, since it is only necessary to provide the partition walls in the grease reservoir, the structure of the rolling bearing device can be prevented from becoming complicated. Thus, the base oil contained in the grease can be continuously supplied to the rolling bearing over a long time period, which makes it possible to maintain the lubrication performance for the rolling bearing over a longer time period.

In the above-mentioned aspect, a groove may be provided between each of the partition walls and the grease accommodated in the accommodation chamber on at least one of both sides of the partition wall in the circumferential direction, the groove extending from the flow path to a back side of the grease reservoir along the axial direction of the spacer. The partition walls may be made of a porous material.

According to the above configuration, the groove is provided between each of the partition walls and the grease on at least one of both sides of the partition wall in the circumferential direction. The base oil contained in the grease can be preferentially supplied to the flow path from the surface of the grease, which is formed by the groove. Thus, the base oil is caused to flow in the axial direction from the back side of the grease reservoir to the flow path. As a result, the base oil of the grease on the back side of the grease reservoir can be effectively used, and the base oil can be sequentially supplied to the rolling bearing. In addition, since the plurality of grooves is provided between the grease and the partition walls, the sum of the surface areas of the surfaces of the grease is increased, which results in an increase in a supply amount of the base oil from the surfaces of the grease. Therefore, it is possible to reduce the occurrence of the breakage of the grease along the circumferential direction of the spacer. In addition, even if the breakage of the grease occurs, the base oil can be prevented from being depleted near the rolling bearing.

In addition, the grease in the adjacent accommodation chambers is divided by the partition wall. Therefore, even if vibrations or the like caused by the rotation of the rolling bearing act on the grease reservoir, it is possible to avoid the situation where the grease in one accommodation chamber and the grease in the adjacent accommodation chamber are connected to each other. Thus, the grooves can be prevented from disappearing. Thus, it is possible to maintain the state in which the surfaces of the grease are exposed over a long time period. According to the above configuration, the partition walls are made of a porous material. By the capillary action of the porous material, the base oil contained in the grease around the partition walls can penetrate the partition walls. When the grease is left in a state of being filled in the accommodation chambers of the grease reservoir, the base oil contained in the grease around the partition walls is absorbed in the partition walls to form the grooves around the partition walls. Thus, the grooves in the above configuration can be easily formed without using any jig.

In the above-mentioned aspect, ends of the partition walls on the side of the rolling bearing in the axial direction may be in contact with the rolling bearing.

According to the above configuration, the ends of the partition walls made of the porous material on a near side in the axial direction are in contact with the rolling bearing. Since the partition walls are made of the porous material, the base oil contained in the grease penetrates the partition walls. Since the base oil penetrates the ends of the partition walls on the side of the rolling bearing, and the ends of the partition walls are in contact with the rolling bearing, the base oil can be directly supplied to the rolling bearing via the partition walls. Since the base oil penetrating the partition walls is free from the occurrence of the breakage of the grease, the base oil contained in the grease can be continuously supplied to the rolling bearing over a longer time period.

In the above-mentioned aspect, each of the partition walls and the spacer may be separate members, each of the partition walls may extend to a back part of the grease reservoir, and back-side ends of the partition walls may be fitted and fixed to the spacer.

According to the above configuration, the back-side ends of the partition walls are fitted and fixed to the spacer. Therefore, the partition walls can be firmly provided in the grease reservoir.

A third aspect of the invention relates to a rolling bearing device including: a rolling bearing including an inner ring, an outer ring, and a plurality of rolling elements arranged between the inner ring and the outer ring; a spacer provided adjacent to one side of the rolling bearing in an axial direction and having a grease reservoir, a plurality of partition walls, and a flow path, the grease reservoir being in a form of a groove, extending along a circumferential direction, and having grease reserved in the grease reservoir, the plurality of partition walls partitioning the grease reservoir into a plurality of accommodation chambers in the circumferential direction, and the flow path providing communication between the accommodation chambers and an inner part of the rolling bearing; and a grease spacer provided between each of the partition walls and the grease accommodated in the accommodation chamber on at least one of both sides of the partition wall in the circumferential direction, the grease spacer extending from the flow path to a back side of the accommodation chamber along the axial direction of the spacer.

According to the third aspect, the groove in the rolling bearing device according to the second aspect of the invention can be easily formed by using the grease spacer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 15A and 15B are sectional views of the rolling bearing device for describing the processes of forming grooves shown in FIG. 13 in the order in which the grooves are formed.

DETAILED DESCRIPTION OF EMBODIMENTS

Figure 1:
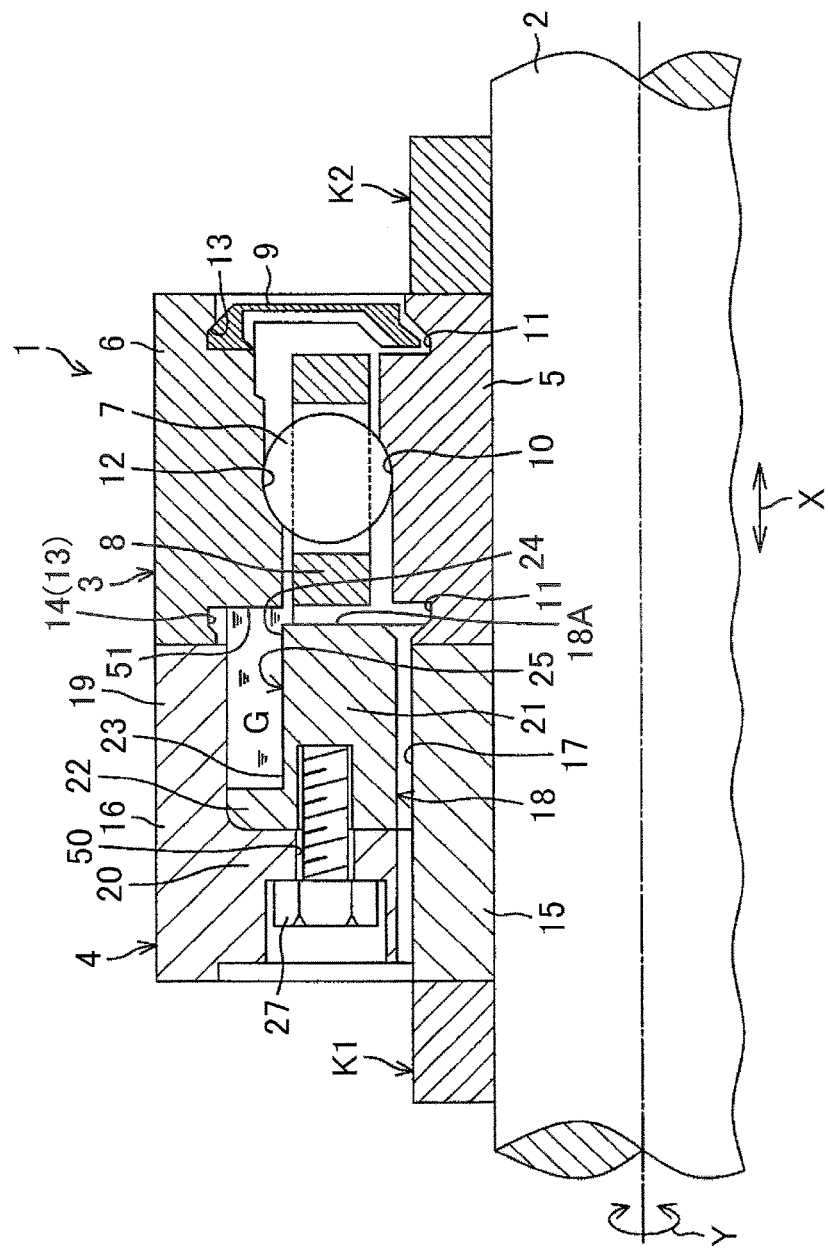
FIG. 1 is a sectional view of a rolling bearing device according to a first embodiment of the invention.

Hereinafter, a description will be given in detail of an embodiment of the invention with reference to the accompanying drawings. FIG. 1 is a sectional view of a rolling bearing device 1 according to a first embodiment of the invention. The rolling bearing device 1 is, for example, a device that supports a main shaft 2 (supported by a rolling bearing) of a machine tool. With reference to FIG. 1, the rolling bearing device 1 includes a rolling bearing 3 constituted by an angular contact ball bearing and a grease reservoir member 4 provided adjacent to the rolling bearing 3 as an example of the spacer of the invention.

As shown in FIG. 1, the rolling bearing 3 includes an inner ring 5 externally fitted to the main shaft 2 (i.e., fitted to an outer periphery of the main shaft 2), an outer ring 6 internally fitted to the housing (not shown) of the machine tool (i.e., fitted to an inner periphery of the housing of the machine tool), a plurality of rolling elements 7 interposed between the inner ring 5 and the outer ring 6, a cylindrical cage 8 that retains the plurality of rolling elements 7 at given intervals in a circumferential direction Y, and a seal 9 that seals one end (the right end in FIG. 1, i.e., the end on the side opposite to the grease reservoir member 4) of the annular space between the inner ring 5 and the outer ring 6 in an axial direction X (the axial direction of the main shaft 2). In FIG. 1, the angular contact ball bearing is used as the rolling bearing 3. However, a deep groove ball bearing, a cylindrical roller bearing, a tapered roller bearing, or the like may be used instead.

The inner ring 5 has an inner ring raceway surface 10 on which the rolling elements 7 roll, and which is provided at a central part of the outer periphery of the inner ring 5 in the axial direction X. In addition, the inner ring 5 has first seal grooves 11 provided at both ends of the outer periphery of the inner ring 5 in the axial direction X. The first seal groove 11 on the side (the right side in FIG. 1) away from the grease reservoir member 4 in the axial direction X is fitted to the inner peripheral part (the seal lip) of the seal 9. The outer ring 6 has an outer ring raceway surface 12 on which the rolling elements 7 roll, and which is provided at a central part of the inner periphery of the outer ring 6 in the axial direction X. The outer ring 6 has second seal grooves 13 provided at both ends of the inner periphery of the outer ring 6 in the axial direction X. The second seal groove 13 on the side (the right side in FIG. 1) away from the grease reservoir member 4 in the axial direction X is fitted to the outer peripheral part (the seal lip) of the seal 9.

The second seal groove 13 on the side (the left side in FIG. 1) near the grease reservoir member 4 in the axial direction X functions as an annular groove 14 that reserves grease G. The annular groove 14 is constituted by an annular stepped part 51 formed at the end of the outer ring 6 on the side near the grease reservoir member 4. The stepped part 51 is connected to the outer ring raceway surface 12. The grease G for initial lubrication is filled in the annular groove 14 in advance.

As shown in FIG. 1, the grease reservoir member 4 includes an inner ring spacer 15 that is externally fitted to the main shaft 2, an outer ring spacer 16 that surrounds the inner ring spacer 15 to form annular space 17 between the outer ring spacer 16 and the inner ring spacer 15 and is internally fitted to the housing (not shown) of the machine tool, and a grease accommodation ring 18 that is arranged in the annular space 17 between the inner ring spacer 15 and the outer ring spacer 16. The inner ring spacer 15 is formed in a cylindrical shape that is in contact with the outer peripheral surface of the main shaft 2. As shown in FIG. 1, the inner ring spacer 15 externally fitted to the main shaft 2 is positioned with the end face thereof (the right end face thereof in FIG. 1) on one side in the axial direction X being in contact with the end face of the inner ring 5. The inner ring spacer 15 is positioned in a manner in which a cylindrical body having the inner ring 5 and the inner ring spacer 15 connected to each other is sandwiched between spacers K1 and K2 on both sides in the axial direction X. Each of the spacers K1 and K2 is fixed to the main shaft 2.

The outer ring spacer 16 is formed in a bottomed cylindrical shape that integrally includes a tubular peripheral wall 19 and an annular plate bottom wall 20 that extends from the peripheral edge (the right peripheral edge in FIG. 1) of the peripheral wall 19 on one end thereof in the axial direction to an inside in a radial direction. When the outer ring spacer 16 is externally fitted to the inner ring spacer 15 via the central opening of the bottom wall 20, the annular space 17, which is opened on the side thereof opposed to the rolling bearing 3 and sealed on the side thereof opposite to the opposed side by the bottom wall 20, is defined between the outer ring spacer 16 and the inner ring spacer 15. Note that the "axial direction of the outer ring spacer 16" in the following description will indicate the axial direction of the peripheral wall 19 of the outer ring spacer 16 and correspond to the axial direction X of the main shaft 2 in the first embodiment.

In addition, as shown in FIG. 1, the outer ring spacer 16 is positioned with the end face thereof (the right end face in FIG. 1) on the side of the rolling bearing 3 in the axial direction being in contact with the end face of the outer ring 6. The outer ring spacer 16 is positioned by, for example, a positioning member (not shown) fixed to the housing (not shown). The grease accommodation ring 18 integrally includes a cylindrical part 21 arranged along the inner ring spacer 15 that forms the inner peripheral surface of the annular space 17 and an annular plate back-side flange part 22 that extends from the peripheral edge of the cylindrical part 21 on the side (the left side in FIG. 1) opposite to the rolling bearing 3 in the axial direction of the outer ring spacer 16 to an outside in the radial direction. By the peripheral wall 19 of the outer ring spacer 16 and the cylindrical part 21 and the back-side flange part 22 constituting the grease accommodation ring 18, a grease reservoir 25 having a substantially U-sectional shape and having an opening 24 opposed to the rolling bearing 3 is defined.

The back-side flange part 22 is formed to have a diameter to be substantially fitted into the annular space 17 such that the outer peripheral surface thereof is in contact with the peripheral wall 19 of the outer ring spacer 16 when the grease accommodation ring 18 is placed in the annular space 17. Further, the cylindrical part 21 has an annular wall surface 23 having a diameter smaller than that of the back-side flange part 22. By the annular wall surface 23, the inner periphery of the grease reservoir 25 is defined. The end of the annular wall surface 23 on the side of the rolling bearing 3 in the axial direction of the outer ring spacer 16 is continuous with an opposed end face 18A of the grease accommodation ring 18 that is opposed to the cage 8. In addition, the end of the annular wall surface 23 on the side opposite to the rolling bearing 3 in the axial direction of the outer ring spacer 16 is connected to the back-side flange part 22. Moreover, the entire area of the annular wall surface 23 is constituted by a cylindrical surface about the central axis line of the outer ring spacer 16. In other words, the inner periphery of the grease reservoir 25 has a linear shape in a sectional view of the outer ring spacer 16 in the axial direction, and the radial-size of the grease reservoir 25 on the side of the rolling bearing 3 in the axial direction of the outer ring spacer 16 is the same as that of the grease reservoir 25 on the side opposite to the rolling bearing 3 in the axial direction of the outer ring spacer 16.

The end (the right end in FIG. 1) of the annular wall surface 23 on the side of the rolling bearing 3 in the axial direction of the outer ring spacer 16 is located in the inner part of the rolling bearing 3, i.e., the part between the inner ring 5 and the outer ring 6, and is positioned at the inner area of the annular groove 14. An annular gap defined by the annular groove 14 and the end of the annular wall surface 23 on the side of the rolling bearing 3 in the axial direction forms the opening 24 as an example of the flow path according to the invention that provides communication between the grease reservoir 25 and the inner part (the annular groove 14) of the rolling bearing 3.

In addition, the grease reservoir member 4 has a screw thread hole 50 formed across the bottom wall 20 of the outer ring spacer 16 and the cylindrical part 21 of the grease accommodation ring 18. When the threaded part of a bolt 27 is threadedly engaged with the screw thread of the screw thread hole 50, the grease accommodation ring 18 is fixed to the outer ring spacer 16. The screw thread hole 50 is partially overlapped in position with the grease reservoir 25 when seen in the radial direction of the outer ring spacer 16. The screw thread hole 50 is not provided in the back-side flange part 22, and the screw thread hole 50 is provided in the thick cylindrical part 21. Therefore, as compared with a case in which the screw thread hole 50 is provided in the back-side flange part 22, the depth of the screw thread hole 50 can be formed to be larger. Thus, firm fixation with the bolt 27 is allowed.

The grease G filled in the grease reservoir 25 and the annular groove 14 may contain a urea compound, a barium (Ba) complex soap, a lithium (Li) complex soap, or the like as a thickening agent and contain an ester, a poly-alpha-olefin, or the like as a base oil. Since it is necessary to reserve the grease G in the grease reservoir 25 to supply the base oil to the rolling bearing 3 over a long time period, the grease G preferably has viscosity to some extent so as to reduce flow.

Figure 2:
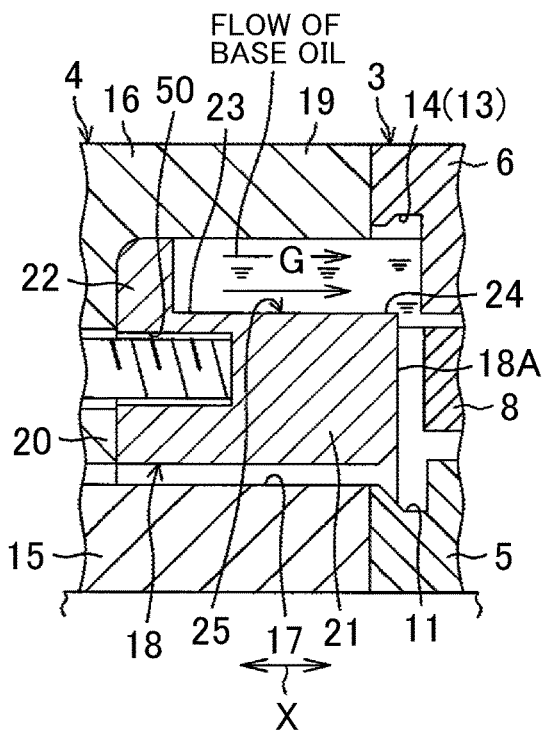
FIG. 2 is an enlarged sectional view of the main part of FIG. 1.

FIG. 2 is an enlarged sectional view of the main part of FIG. 1. A description will be given, with reference to FIG. 2, of the flow of the base oil of the grease G filled in the grease reservoir 25. As shown in FIG. 2, in the rolling bearing device 1, the grease G for initial lubrication is filled in the annular groove 14 of the rolling bearing 3 while the grease G for replenishment is filled in the grease reservoir 25. The grease G in the annular groove 14 and the grease G in the grease reservoir 25 are in contact with each other. Therefore, when the base oil of the grease G in the annular groove 14 is consumed with the operation of the rolling bearing 3, the base oil of the grease G reserved in the grease reservoir 25 moves into the rolling bearing 3.

Figure 3:
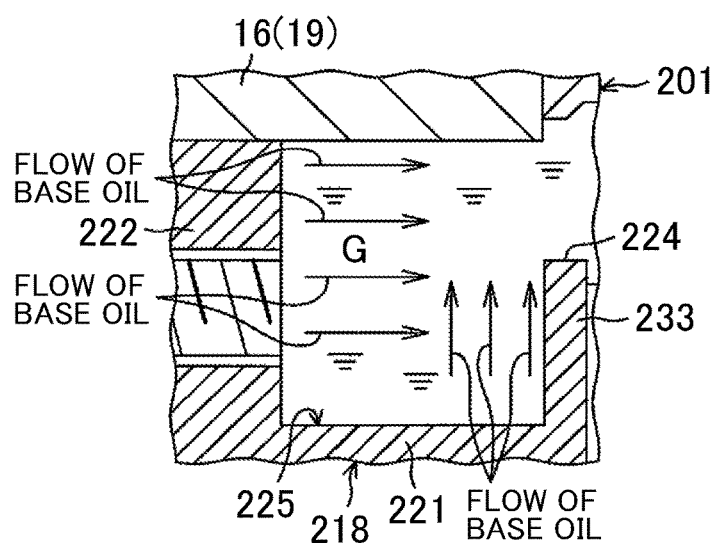
FIG. 3 is an enlarged view for describing the flow of a base oil contained in grease according to a reference mode.

In this case, as shown in FIG. 2 by solid arrows, the base oil flows in the axial direction of the outer ring spacer 16 from the backside of the grease reservoir 25 to the opening 24. FIG. 3 is an enlarged view for describing the flow of a base oil contained in grease G according to a reference mode. Parts common to the respective parts of FIGS. 1 and 2 will be denoted by the same reference numerals and symbols, and their descriptions will be omitted.

A rolling bearing device 201 shown in FIG. 3 includes a grease accommodation ring 218 that will be described below. The grease accommodation ring 218 integrally includes a cylindrical part 221 arranged along an inner ring spacer 15, an annular plate back-side flange part 222 that extends from the peripheral edge of the cylindrical part 221 on the side (the left side in FIG. 3) opposite to a rolling bearing (not shown) in the axial direction of the outer ring spacer 16 to an outside in a radial direction, and an annular plate supply-side flange part 233 that extends from the peripheral edge of the cylindrical part 221 on the side (the right side in FIG. 3) of the rolling bearing in the axial direction of the outer ring spacer 16 to the outside in the radial direction. By a peripheral wall 19 of the outer ring spacer 16 and the cylindrical part 221, the back-side flange part 222, and the supply-side flange part 233 constituting the grease accommodation ring 218, one annular grease reservoir 225 having an opening 224 opposed to the rolling bearing is defined.

In the grease reservoir 225 described above, as shown in FIG. 3 by solid arrows, the base oil generally flows from one side (the left side in FIG. 3) in the axial direction of the outer ring spacer 16 to the other side (the side of the rolling bearing, i.e., the right side in FIG. 3) in the axial direction thereof. However, at an area inner than the opening 224 in the radial direction and near the supply-side flange 233 in the grease reservoir 225, the base oil also flows from the inside to the outside in the radial direction of the outer ring spacer 16 along the inner wall of the supply-side flange 233.

When the rolling bearing device 201 shown in FIG. 3 is continuously used, the breakage of the grease may occur near the opening 224. As a mechanism of the occurrence of the breakage of the grease, the inventor of this application assumes the following mechanism. That is, the grease flowing from one side (the left side in FIG. 3) to the other side (the right side in FIG. 3) in the axial direction of the outer ring spacer 16 and the grease flowing from the inside to the outside in the radial direction of the outer ring spacer 16 are directed to cross each other and interfere with each other near the opening 224 of the grease reservoir 225. This results in a reduction in the flow speed of the base oil at the opening 224, which causes the occurrence of the breakage of the grease. That is, the inventor of this application assumes that the flowing easiness of the base oil varies in the grease reservoir 225 due to the supply-side flange part 233 of the grease accommodation ring 218 and the variation in the flowing easiness of the base oil is a factor causing the breakage of the grease.

With reference back to FIG. 2, the annular wall surface 23 connects the opposed end face 18A that is opposed to the cage 8 and the back-side flange part 22 to each other in the grease accommodation ring 18. In addition, the entire area of the annular wall surface 23 is formed (constituted) by the cylindrical surface. The base oil contained in the grease G in the grease reservoir 25 moves in the grease reservoir 25 to the flow path 24. Since the entire area of the annular wall surface 23 is constituted by the cylindrical surface, the base oil in the grease reservoir 25 flows only in one direction along the annular wall surface 23. That is, the variation in the flowing easiness of the base oil can be avoided in the grease reservoir 25. Accordingly, the occurrence of the breakage of the grease can be reduced or prevented effectively. Thus, the base oil contained in the grease G can be continuously supplied to the rolling bearing 3 over a long time period, which makes it possible to maintain the lubrication performance for the rolling bearing 3 for a longer time period. In addition, since it is only necessary to form the entire area of the annular wall surface 23 that defines the grease reservoir 25 into the flat surface, the structure of the rolling bearing device 1 can be prevented from becoming complicated.

Figure 4:
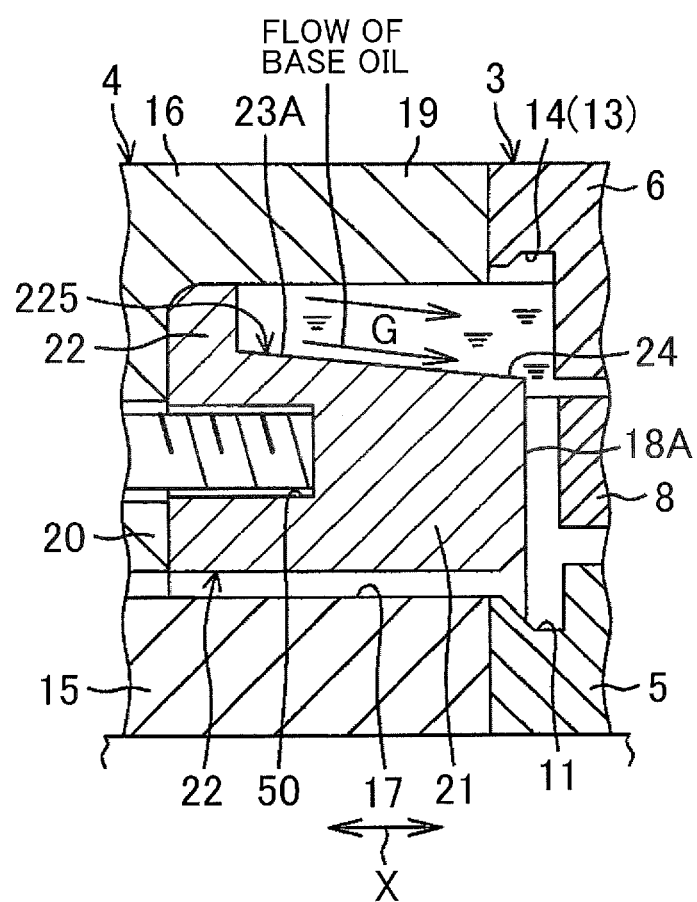
FIG. 4 is a sectional view of the rolling bearing device according to a modified example of the invention.

FIG. 4 is a sectional view of a rolling bearing device according to a modified example of the first embodiment of the invention. In the modified example shown in FIG. 4, the inner periphery of the grease reservoir 25 is defined by an annular wall surface 23A. The end of the annular wall surface 23A on the side of the rolling bearing 3 in the axial direction of the outer ring spacer 16 is continuous with the opposed end face 18A of the grease accommodation ring 18 that is opposed to the cage 8. In addition, the end of the annular wall surface 23A on the side opposite to the rolling bearing 3 in the axial direction of the outer ring spacer 16 is connected to the back-side flange part 22. The entire area of the annular wall surface 23A of the cylindrical part 21 is formed (constituted) by a conical surface about the central axis line of the outer ring spacer 16. The diameter of the conical surface is reduced toward the side of the rolling bearing 3 in the axial direction of the outer ring spacer 16. In other words, the inner periphery of the grease reservoir 25 is formed in a linear shape in a sectional view in the axial direction of the outer ring spacer 16, and the radial-size of the grease reservoir 25 on the side of the rolling bearing 3 in the axial direction of the outer ring spacer 16 is larger than that of the grease reservoir 25 on the side opposite to the rolling bearing 3 in the axial direction thereof. An annular gap defined by the annular groove 14 and the end of the annular wall surface 23A on the side of the rolling bearing 3 in the axial direction of the outer ring spacer 16 forms the opening 24.

The annular wall surface 23A connects the opposed end face 18A that is opposed to the cage 8 and the back-side flange part 22 of the grease accommodation ring 18 to each other. Since the entire area of the annular wall surface 23A is constituted by the conical surface, the base oil in the grease reservoir 25 flows only in one direction (as indicated by solid arrows in FIG. 4) along the annular wall surface 23A. Accordingly, the variation in the flowing easiness of the base oil can be avoided in the grease reservoir 25. Accordingly, the occurrence of the breakage of the grease can be reduced or prevented effectively. Thus, the base oil contained in grease G can be continuously supplied to the rolling bearing 3 over a long time period, which makes it possible to maintain the lubrication performance for the rolling bearing 3 over a longer time period. In addition, since it is only necessary to form the entire area of the annular wall surface 23A that defines the grease reservoir 25 into the conical surface, the structure of the rolling bearing device 1 can be prevented from becoming complicated.

The first embodiment of the invention is described above, but the invention may be carried out in other modes. For example, the first embodiment describes the case in which the grease reservoir 25 is an annular one reservoir. However, the grease reservoir 25 may be divided into a plurality of chambers along the circumferential direction of the outer ring spacer 16.

In addition, the first embodiment describes the case in which each of the inner ring 5 and the inner ring spacer 15 serves as a rotation side that rotates together with the main shaft 2 while each of the outer ring 6 and the outer ring spacer 16 serves as a stationary side that is in a stationary state of being fixed to the housing (not shown). However, the invention of this application may also be applied to a case in which each of the outer ring 6 and the outer ring spacer 16 serves as a rotation side while each of the inner ring 5 and the inner ring spacer 15 serves as a stationary side.

Besides, it is possible to add various modifications within the scope of the invention.

Figure 5:
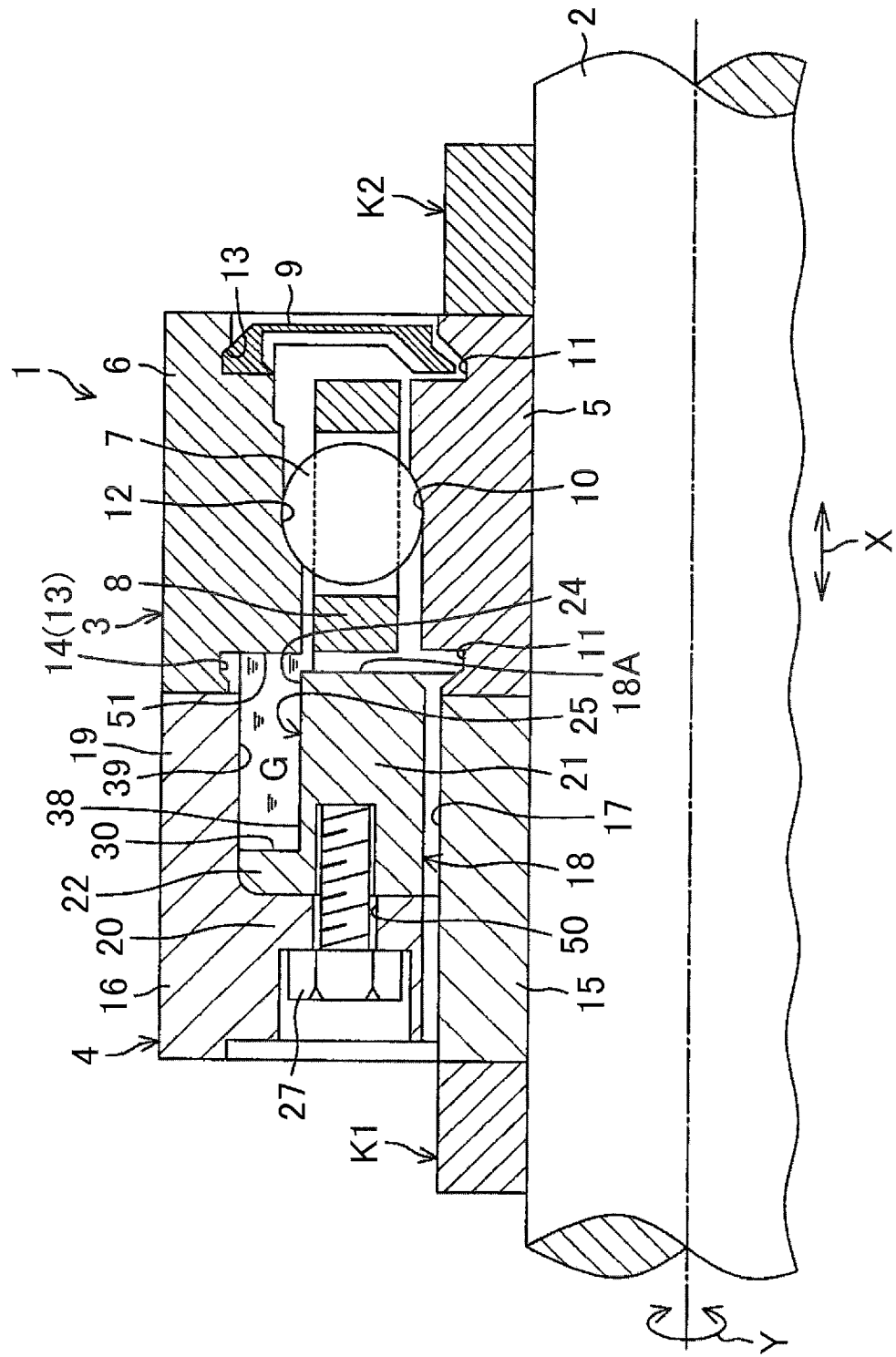
FIG. 5 is a sectional view of a rolling bearing device according to a second embodiment of the invention.

Hereinafter, a description will be given in detail of an embodiment of the invention with reference to the accompanying drawings. FIG. 5 is a sectional view of a rolling bearing device 1 according to a second embodiment of the invention. The rolling bearing device 1 is, for example, a device that supports a main shaft 2 (supported by a rolling bearing) of a machine tool. With reference to FIG. 5, the rolling bearing device 1 includes a rolling bearing 3 constituted by an angular contact ball bearing and a grease reservoir member 4 provided adjacent to the rolling bearing 3 as an example of the spacer according to the invention.

As shown in FIG. 5, the rolling bearing 3 includes an inner ring 5 externally fitted to the main shaft 2, an outer ring 6 internally fitted to the housing (not shown) of the machine tool, a plurality of rolling elements 7 interposed between the inner ring 5 and the outer ring 6, a cylindrical cage 8 that retains the plurality of rolling elements 7 at given intervals in a circumferential direction Y, and a seal 9 that seals one end (the right end in FIG. 5, i.e., the end on the side opposite to the grease reservoir member 4) of the annular space between the inner ring 5 and the outer ring 6 in an axial direction X (the axial direction of the main shaft 2). In FIG. 5, the angular contact ball bearing is used as the rolling bearing 3. However, a deep groove ball bearing, a cylindrical roller bearing, a tapered roller bearing, or the like may be used instead.

The inner ring 5 has an inner ring raceway surface 10 on which the rolling elements 7 roll, and which is provided at a central part of the outer periphery of the inner ring 5 in the axial direction X. In addition, the inner ring 5 has first seal grooves 11 provided at both ends of the outer periphery of the inner ring 5 in the axial direction X. The first seal groove 11 on the side (the right side in FIG. 5) away from the grease reservoir member 4 in the axial direction X is fitted to the inner peripheral part (the seal lip) of the seal 9. The outer ring 6 has an outer ring raceway surface 12 on which the rolling elements 7 roll, and which is provided at a central part of the inner periphery of the outer ring 6 in the axial direction X. The outer ring 6 has second seal grooves 13 provided at both ends of the inner periphery of the outer ring 6 in the axial direction X. The second seal groove 13 on the side (the right side in FIG. 5) away from the grease reservoir member 4 in the axial direction X is fitted to the outer peripheral part (the seal lip) of the seal 9.

The second seal groove 13 on the side (the left side in FIG. 5) near the grease reservoir member 4 in the axial direction X functions as an annular groove 14 that reserves grease G. The annular groove 14 is constituted by an annular stepped part 51 formed at the end of the outer ring 6 on the side near the grease reservoir member 4. The stepped part 51 is connected to the outer ring raceway surface 12. The grease G for initial lubrication is filled in the annular groove 14 in advance.

As shown in FIG. 5, the grease reservoir member 4 includes an inner ring spacer 15 that is externally fitted to the main shaft 2, an outer ring spacer 16 that surrounds the inner ring spacer 15 to form annular space 17 between the outer ring spacer 16 and the inner ring spacer 15 and is internally fitted to the housing (not shown) of the machine tool, and a grease accommodation ring 18 that is arranged in the annular space 17 between the inner ring spacer 15 and the outer ring spacer 16. The inner ring spacer 15 is formed in a cylindrical shape that is in contact with the outer peripheral surface of the main shaft 2. As shown in FIG. 5, the inner ring spacer 15 externally fitted to the main shaft 2 is positioned with the end face thereof (the right end face thereof in FIG. 5) on one side in the axial direction X being in contact with the end face of the inner ring 5. The inner ring spacer 15 is positioned in a manner in which a cylindrical body having the inner ring 5 and the inner ring spacer 15 connected to each other is sandwiched between spacers K1 and K2 on both sides in the axial direction X. Each of the spacers K1 and K2 is fixed to the main shaft 2.

The outer ring spacer 16 is formed in a bottomed cylindrical shape that integrally includes a tubular peripheral wall 19 and a bottom wall 20 that extends from the peripheral edge (the right peripheral edge in FIG. 5) of the peripheral wall 19 on one end in the axial direction to an inside in a radial direction. When the outer ring spacer 16 is externally fitted to the inner ring spacer 15 via the central opening of the bottom wall 20, the annular space 17, which is opened on the side thereof opposed to the rolling bearing 3 and sealed on the side thereof opposite to the opposed side by the bottom wall 20, is defined between the outer ring spacer 16 and the inner ring spacer 15. Note that the "axial direction of the outer ring spacer 16" in the following description will indicate the axial direction of the peripheral wall 19 of the outer ring spacer 16 and correspond to the axial direction X of the main shaft 2 in the second embodiment.

In addition, as shown in FIG. 5, the outer ring spacer 16 is positioned with the one-side end face thereof (the right end face in FIG. 5) in the axial direction X being in contact with the end face of the outer ring 6. The outer ring spacer 16 is positioned by, for example, a positioning member (not shown) fixed to the housing. The grease accommodation ring 18 integrally includes a cylindrical part 21 arranged along the inner ring spacer 15 that form the inner peripheral surface of the annular space 17 and an annular plate back-side flange part 22 that extends from the peripheral edge of the cylindrical part 21 on one side (the left side in FIG. 5) in the axial direction of the outer ring spacer 16 to an outside in the radial direction. By the peripheral wall 19 of the outer ring spacer 16 and the cylindrical part 21 and the back-side flange part 22 constituting the grease accommodation ring 18, a grease reservoir 25 having a substantially U-sectional shape and having an opening 24 opposed to the rolling bearing 3 is defined. More specifically, the grease reservoir 25 is defined by an outer peripheral surface 38 of the cylindrical part 21, an inner peripheral surface 39 of the peripheral wall 19, and an inner wall surface 30 of the back-side flange part 22, i.e., an example of the back-side wall surface according to the invention.

The back-side flange part 22 is formed to have a diameter to be substantially fitted into the annular space 17 such that the outer peripheral surface thereof is in contact with the peripheral wall 19 of the outer ring spacer 16 when the grease accommodation ring 18 is placed in the annular space 17. Further, the cylindrical part 21 has the outer peripheral surface 38 having a diameter smaller than that of the back-side flange part 22. By the outer peripheral surface 38, the inner periphery of the grease reservoir 25 is defined. The end of the outer peripheral surface 38 on the side of the rolling bearing 3 in the axial direction of the outer ring spacer 16 is continuous with an opposed end face 18A of the grease accommodation ring 18 that is opposed to the cage 8. In addition, the end of the outer peripheral surface 38 on the side opposite to the rolling bearing 3 in the axial direction of the outer ring spacer 16 is connected to the back-side flange part 22. Moreover, the entire area of the outer peripheral surface 38 is constituted by a cylindrical surface about the central axis line of the outer ring spacer 16. In other words, the inner periphery of the grease reservoir 25 is formed in a linear shape in a sectional view in the axial direction of the outer ring spacer 16, and the radial-size of the grease reservoir 25 on the side of the rolling bearing 3 in the axial direction of the outer ring spacer 16 is the same as that of the grease reservoir 25 on the side opposite to the rolling bearing 3 in the axial direction thereof.

The end (the right end in FIG. 5) of the outer peripheral surface 38 on the side of the rolling bearing 3 in the axial direction of the outer ring spacer 16 is located in the inner part of the rolling bearing 3, i.e., the part between the inner ring 5 and the outer ring 6, and is positioned at the inner area of the annular groove 14. An annular gap defined by the annular groove 14 and the end of the outer peripheral surface 38 on the other side in the axial direction forms the opening 24 as an example of the flow path according to the second embodiment of the invention that provides communication between the grease reservoir 25 and the inner part (the annular groove 14) of the rolling bearing 3.

In addition, the grease reservoir member 4 has a screw thread hole 50 formed across the bottom wall 20 of the outer ring spacer 16 and the cylindrical part 21 of the grease accommodation ring 18. When the threaded part of a bolt 27 is threadedly engaged with the screw thread of the screw thread hole 50, the grease accommodation ring 18 is fixed to the outer ring spacer 16. The screw thread hole 50 is partially overlapped in position with the grease reservoir 25 when seen in the radial direction of the outer ring spacer 16. The screw thread hole 50 is not provided in the back-side flange part 22, and the screw thread hole 50 is provided in the thick cylindrical part 21. Therefore, as compared with a case in which the screw thread hole 50 is provided in the back-side flange part 22, the depth of the screw thread hole 50 can be formed to be larger. Thus, firm fixation with the bolt 27 is allowed.

The grease G filled in the grease reservoir 25 and the annular groove 14 may contain a urea compound, a Ba complex soap, a Li complex soap, or the like as a thickening agent and contain an ester, a poly-alpha-olefin, or the like as a base oil. Since it is necessary to reserve the grease G in the grease reservoir 25 to supply the base oil to the rolling bearing 3 over a long time period, the grease G preferably has viscosity to some extent so as to reduce flow.

Figure 6:
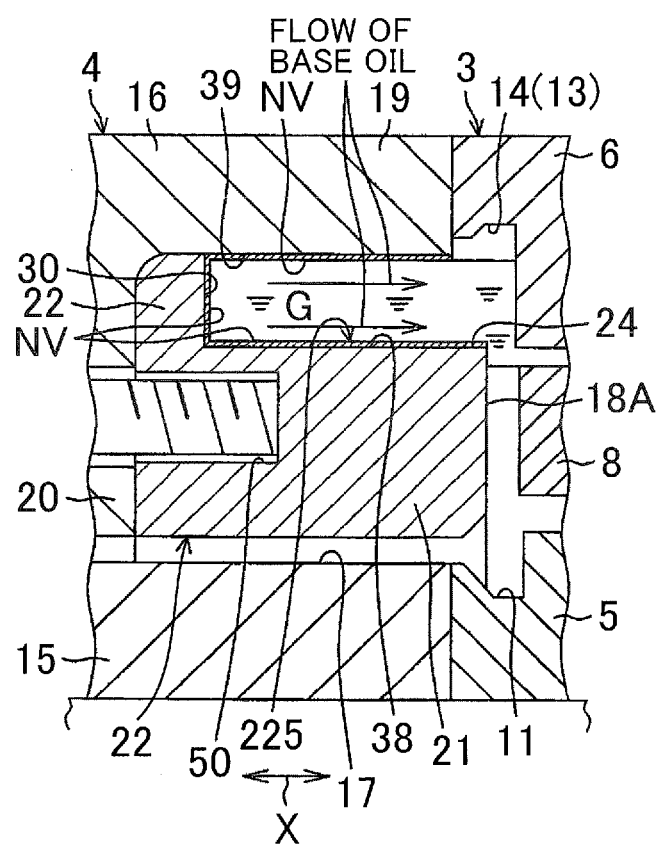
FIG. 6 is an enlarged sectional view of the main part of FIG. 5.

FIG. 6 is an enlarged sectional view of the main part of FIG. 5. As shown in FIG. 6, the entire areas of inner wall surfaces defining the grease reservoir 25, i.e., the entire area of each of the outer peripheral surface 38 of the cylindrical part 21, the inner peripheral surface 39 of the peripheral wall 19, and the inner wall surface 30 of the back-side flange part 22 is subjected to non-viscous surface treatment. Specifically, the entire area of each of the outer peripheral surface 38, the inner peripheral surface 39, and the inner wall surface 30 is coated with a non-viscous resin layer NV (in other words, a non-viscous resin layer NV is disposed on the entire area of each of the outer peripheral surface 38, the inner peripheral surface 39, and the inner wall surface 30). Examples of a non-viscous resin may include a fluorine-based resin and a silicon-based resin. Specific examples of the fluorine-based resin include a polytetrafluoroethylene (PTFE), a perfluoroalkoxy fluorine-based resin (PFA), a fluorinated ethylene-propylene copolymer (FEP), or the like.

As shown in FIG. 6, in the rolling bearing device 1, the grease G for initial lubrication is filled in the annular groove 14 of the rolling bearing 3 while the grease G for replenishment is filled in the grease reservoir 25. The grease G in the annular groove 14 and the grease G in the grease reservoir 25 are in contact with each other. Therefore, when the base oil of the grease G in the annular groove 14 is consumed with the operation of the rolling bearing 3, the base oil of the grease G reserved in the grease reservoir 25 moves into the rolling bearing 3 by the capillary action of the thickening agent of the grease G.

Figure 7:
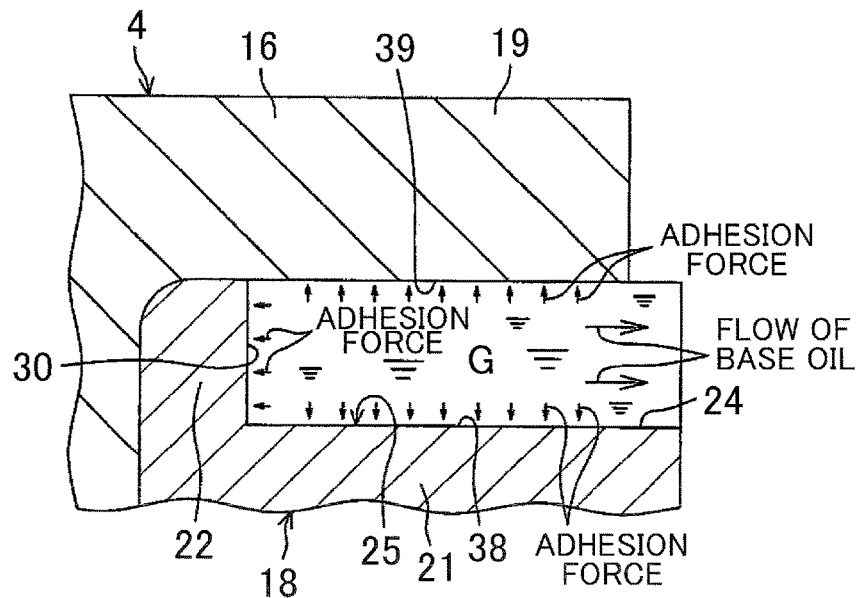
FIG. 7 is a reference view for describing the flow of a base oil contained in grease in a case in which inner wall surfaces defining a grease reservoir are not subjected to non-viscous surface treatment.

In this case, as shown in FIG. 6 by solid arrows, the base oil flows in the axial direction of the outer ring spacer 16 from the backside of the grease reservoir 25 to the opening 24. FIG. 7 is a reference view for describing the flow of the base oil contained in the grease G in a case in which the inner wall surfaces defining the grease reservoir 25 are not subjected to the non-viscous surface treatment. In the example of FIG. 7, none of the outer peripheral surface 38 of the cylindrical part 21, the inner peripheral surface 39 of the peripheral wall 19, and the inner wall surface 30 of the back-side flange part 22 is coated with the non-viscous resin layer NV. In other words, none of the outer peripheral surface 38, the inner peripheral surface 39, and the inner wall surface 30 is not subjected to the non-viscous surface treatment.

In a state in which the grease G is accommodated in the grease reservoir 25, the grease G adheres onto the inner wall surfaces (the outer peripheral surface 38, the inner peripheral surface 39, and the inner wall surface 30 that may be expressed as "inner wall surfaces 38, 39, and 30" below) of the grease reservoir 25. Since the grease G has viscosity to some extent, adhesion forces are generated at the boundaries between the grease G and the inner wall surfaces 38, 39, and 30 of the grease reservoir 25.

Meanwhile, the grease G is partially separated from the inner wall surfaces as the supply of the grease G continues, whereby separation forces for separating the grease G from the inner wall surfaces are locally generated in the grease G. The separation forces and the adhesion forces are directed opposite to each other. Therefore, when the large separation forces and the large adhesion forces are generated, the breakage of the grease G may occur. The inventor of this application assumes the above mechanism as a mechanism of the occurrence of the breakage of the grease in the grease reservoir 25.

With reference back to FIG. 6, the entire areas of all the inner wall surfaces 38, 39, and 30 of the grease reservoir 25 are coated with the non-viscous resin layer NV. Therefore, adhesion forces are hardly generated or only relatively weak adhesion forces are generated at the boundaries between the grease G and the inner wall surfaces 38, 39, and 30. Accordingly, when separation forces for separating the grease G from the inner wall surfaces 38, 39, and 30 are locally generated in the grease G, the grease G is entirely separated from the wall surfaces. That is, since the inner wall surfaces 38, 39, and 30 are subjected to the non-viscous surface treatment, the adhesion forces generated in the grease G are not so large as to cause the occurrence of the breakage of the grease. Therefore, the occurrence of the breakage of the grease G can be prevented or reduced.

In addition, since the entire area of the outer peripheral surface 38 is formed (constituted) by the flat surface (cylindrical surface) and the opening 24 is formed in the outer peripheral surface 38, the base oil in the grease reservoir 25 flows only in one direction (as indicated by solid arrows in FIG. 6) along the outer peripheral surface 38 constituted by the cylindrical surface. Accordingly, the variation in the flowing easiness of the base oil can be avoided in the grease reservoir 25. Therefore, the occurrence of the breakage of the grease can be reduced or prevented effectively.

Figure 8:
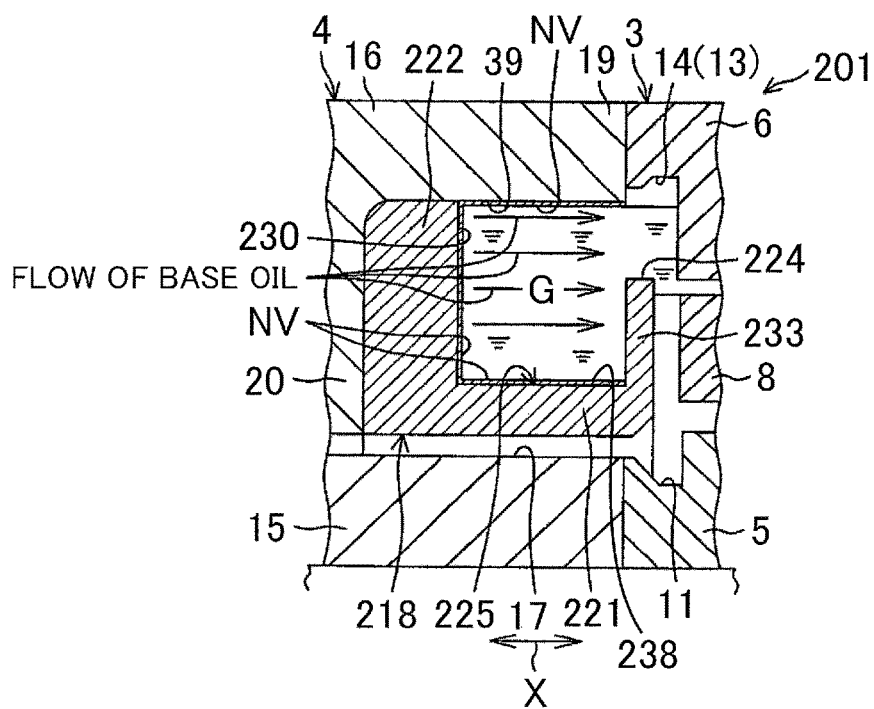
FIG. 8 is a sectional view of a rolling bearing device according to a third embodiment of the invention.

Thus, the base oil contained in the grease G can be continuously supplied to the rolling bearing 3 over a long time period, which makes it possible to maintain the lubrication performance for the rolling bearing 3 over a longer time period. In addition, since it is only necessary to coat the inner wall surfaces 38, 39, and 30 with the non-viscous resin layer NV, the structure of the rolling bearing device 1 can be prevented from becoming complicated. FIG. 8 is a sectional view of a rolling bearing device 201 according to a third embodiment of the invention.

In the third embodiment, parts corresponding to the respective parts described in the second embodiment will be denoted by the same reference numerals and symbols as those of FIGS. 5 and 6, and their descriptions will be omitted. The rolling bearing device 201 according to the third embodiment includes, instead of the above grease accommodation ring 18 (see FIG. 5), a grease accommodation ring 218 that will be described below. The grease accommodation ring 218 integrally includes a cylindrical part 221 arranged along an inner ring spacer (not shown), and an annular plate back-side flange part 222 and an annular plate supply-side flange part 233 that are arranged in the axial direction of the cylindrical part 221. Here, the annular plate back-side flange part 222 extends from the peripheral edge of the cylindrical part 221 on one side (the left side in FIG. 8) in the axial direction of an outer ring spacer 16 to an outside in a radial direction, and the annular plate supply-side flange part 233 extends from the peripheral edge of the cylindrical part 221 on the side opposite to the back-side flange part 222 to the outside in the radial direction. By a peripheral wall 19 of the outer ring spacer 16 and the cylindrical part 221, the back-side flange part 222, and the supply-side flange part 233 constituting the grease accommodation ring 218, one annular grease reservoir 225 having an opening 224 opposed to a rolling bearing (not shown) is defined.

The supply-side flange part 233 of the grease accommodation ring 218 is located in the inner part of the rolling bearing 3, i.e., the part between an inner ring 5 and an outer ring 6, and is positioned at the inner area of an annular groove 14. The supply-side flange part 233 is formed to have a diameter smaller than that of the back-side flange part 222. Specifically, the back-side flange part 222 is formed to have a diameter to be substantially fitted into an annular space 17 such that the outer peripheral surface thereof is in contact with the peripheral wall 19 of the outer ring spacer 16 when the grease accommodation ring 218 is placed in the annular space 17. On the other hand, the supply-side flange part 233 has a diameter smaller than that of the back-side flange part 222. Thus, an annular gap is formed between the supply-side flange part 233 and the peripheral wall 19 of the outer ring spacer 16, and the annular gap forms the opening 24 as an example of the flow path according to the third embodiment of the invention that provides communication between the grease reservoir 225 and the inner part (the annular groove 14) of the rolling bearing 3.

As shown in FIG. 8, among inner wall surfaces defining the grease reservoir 225, the entire area of each of an outer peripheral surface 238 of the cylindrical part 221, an inner peripheral surface 39 of the peripheral wall 19, and an inner wall surface 230 of the back-side flange part 222 is coated with a non-viscous resin layer NV. The inner wall surfaces (the outer peripheral surface 238, the inner peripheral surface 39, and the inner wall surface 230 that will be expressed as the "inner wall surfaces 238, 39, and 230" where necessary) of the grease reservoir 225 are coated with the non-viscous resin layer NV. Therefore, adhesion forces are hardly generated or only relatively weak adhesion forces are generated at the boundaries between the grease G and the inner wall surfaces 238, 39, and 230. Accordingly, when separation forces for separating the grease G from the inner wall surfaces 238, 39, and 230 are locally generated in the grease G, the grease G is entirely separated from the wall surfaces. That is, since the inner wall surfaces 238, 39, and 230 are subjected to the non-viscous surface treatment, the adhesion forces generated in the grease G are not so large as to cause the occurrence of the breakage of the grease. Therefore, the occurrence of the breakage of the grease G can be prevented or reduced.

The second and third embodiments of the invention are described above, but the invention may be carried out in other modes. For example, the second and third embodiments describe the cases in which the non-viscous resin layer NV is coated as an example of the non-viscous surface treatment. However, the non-viscous surface treatment may be realized in a manner in which the inner wall surfaces of the grease reservoir 25 or 225 are coated with a certain kind of oil immiscible with the base oil of the grease G.

In addition, the second embodiment describes the case in which all the inner wall surfaces 38, 39, and 30 of the grease reservoir 25 are subjected to the non-viscous surface treatment. However, only the inner peripheral surface 39 of the peripheral wall 19 and the inner wall surface 30 of the back-side flange part 222 may be subjected to the non-viscous surface treatment, and the outer peripheral surface 38 of the cylindrical part 21 may not be subjected to the non-viscous surface treatment. At least the inner wall surface 30 of the back-side flange part 222 is desirably subjected to the non-viscous surface treatment.

Moreover, the third embodiment describes the case in which the inner wall surfaces 238, 39, and 230 of the inner wall surfaces of the grease reservoir 225 are subjected to the non-viscous surface treatment. At least the inner wall surface 230 of the back-side flange part 222 is desirably subjected to the non-viscous surface treatment. Further, each of the second and third embodiments describes the case in which the grease reservoir 25 or 225 is one annular grease reservoir. However, each of the grease reservoirs 25 and 225 may be divided into a plurality of chambers along the circumferential direction of the outer ring spacer 16.

Further, the second and third embodiments describe the cases in which each of the inner ring 5 and the inner ring spacer 15 serves as a rotation side that rotates together with the main shaft 2 while each of the outer ring 6 and the outer ring spacer 16 serves as a stationary side that is in a stationary state of being fixed to the housing (not shown). However, the invention of this application may also be applied to a case in which each of the outer ring 6 and the outer ring spacer 16 serves as a rotation side while each of the inner ring 5 and the inner ring spacer 15 serves as a stationary side.

Besides, it is possible to add various modifications within the scope of the invention.

Figure 9:
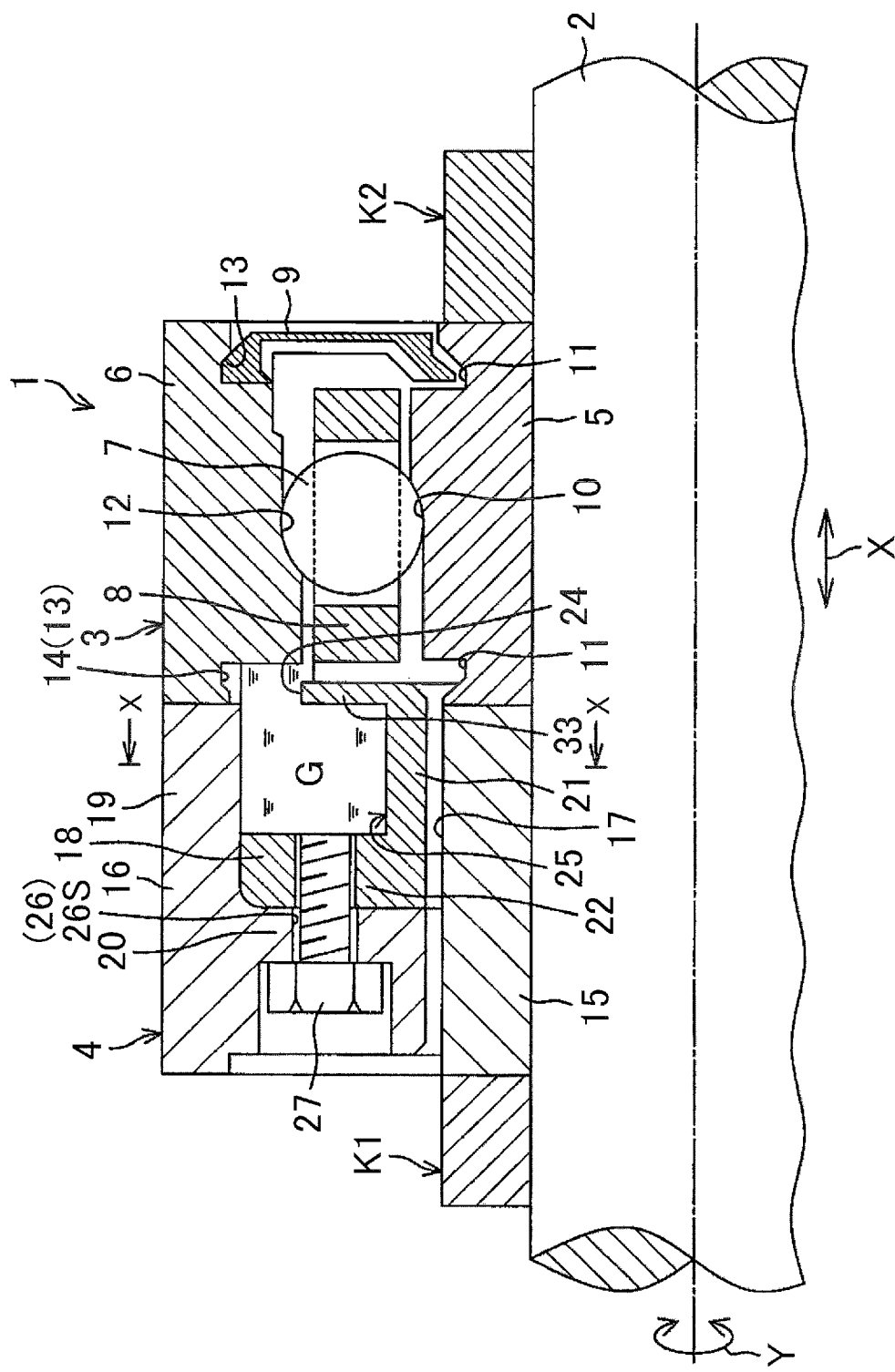
FIG. 9 is a sectional view of a rolling bearing device according to a fourth embodiment of the invention.
Figure 10:
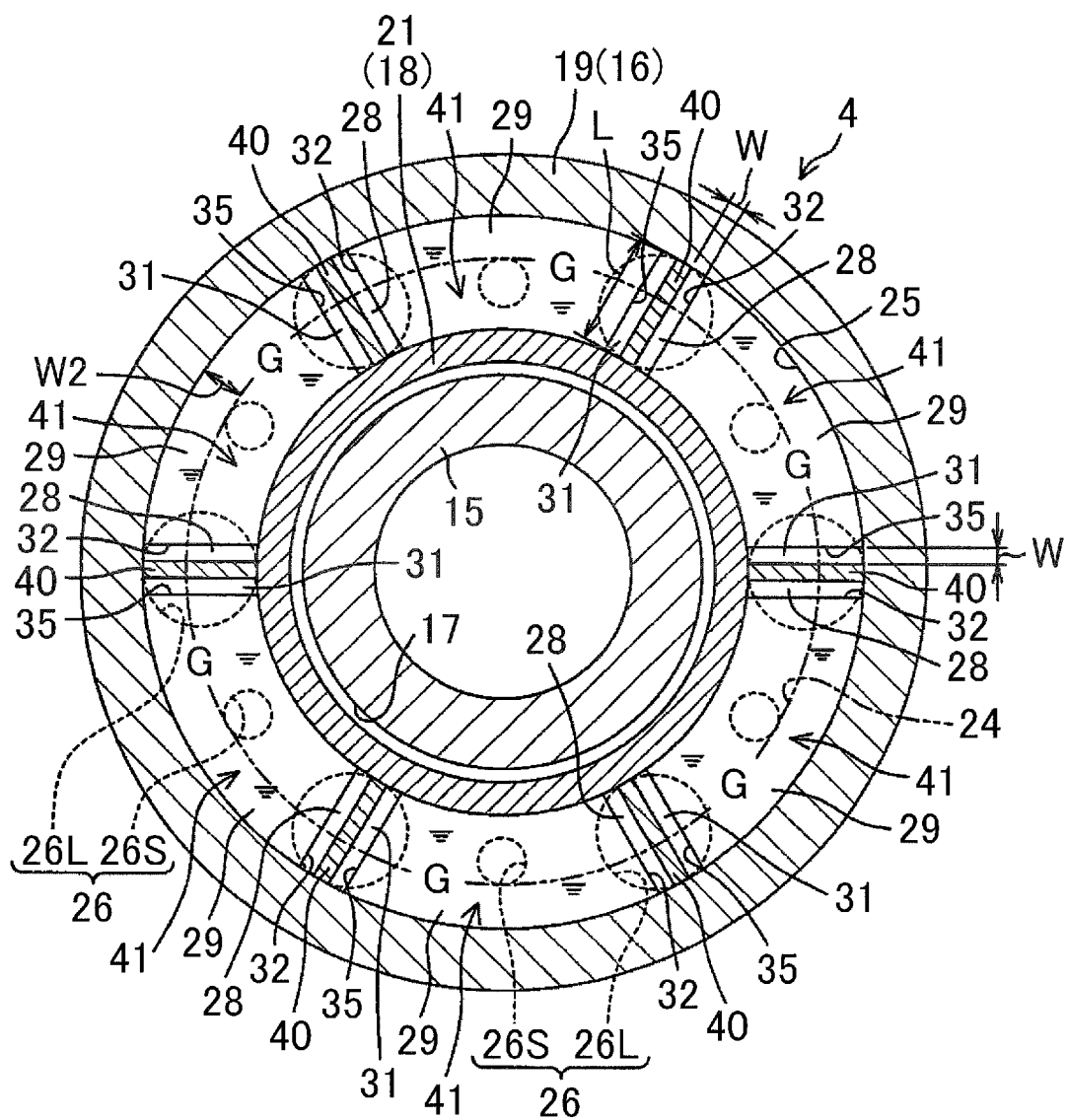
FIG. 10 is a sectional view of a grease reservoir member shown in FIG. 9 and shows a face corresponding to the cross section of the rolling bearing device taken along line X-X in FIG. 9.

Hereinafter, a description will be given in detail of an embodiment of the invention with reference to the accompanying drawings. FIG. 9 is a sectional view of a rolling bearing device 1 according to a fourth embodiment of the invention. FIG. 10 is a sectional view of a grease reservoir member 4 and shows a face corresponding to the cross section of the rolling bearing device 1 taken along line X-X in FIG. 9. The rolling bearing device 1 is a device that supports, for example, a main shaft 2 (supported by a rolling bearing) of a machine tool.

With reference to FIG. 9, the rolling bearing device 1 includes a rolling bearing 3 constituted by an angular contact ball bearing and a grease reservoir member 4 provided adjacent to the rolling bearing 3 as an example of the spacer according to the fourth embodiment of the invention. As shown in FIG. 9, the rolling bearing 3 includes an inner ring 5 externally fitted to the main shaft 2, an outer ring 6 internally fitted to the housing (not shown) of the machine tool, a plurality of rolling elements 7 interposed between the inner ring 5 and the outer ring 6, a cylindrical cage 8 that retains the plurality of rolling elements 7 at given intervals in a circumferential direction Y, and a seal 9 that seals one end (the right end in FIG. 9, i.e., the end on the side opposite to the grease reservoir member 4) of the annular space between the inner ring 5 and the outer ring 6 in an axial direction X (the axial direction of the main shaft 2). In FIG. 9, the angular contact ball bearing is used as the rolling bearing 3. However, a deep groove ball bearing, a cylindrical roller bearing, a tapered roller bearing, or the like may be used instead.

The inner ring 5 has an inner ring raceway surface 10 on which the rolling elements 7 roll, and which is provided at a central part of the outer periphery of the inner ring 5 in the axial direction X. In addition, the inner ring 5 has first seal grooves 11 provided at both ends of the outer periphery of the inner ring 5 in the axial direction X. The first seal groove 11 on the side (the right side in FIG. 9) away from the grease reservoir member 4 in the axial direction X is fitted to the inner peripheral part (the seal lip) of the seal 9. The outer ring 6 has an outer ring raceway surface 12 on which the rolling elements 7 roll, and which is provided at a central part of the inner periphery of the outer ring 6 in the axial direction X. The outer ring 6 has second seal grooves 13 provided at both ends of the inner periphery of the outer ring 6 in the axial direction X. The second seal groove 13 on the side (the right side in FIG. 9) away from the grease reservoir member 4 in the axial direction X is fitted to the outer peripheral part (the seal lip) of the seal 9.

The second seal groove 13 on the side (the left side in FIG. 9) near the grease reservoir member 4 in the axial direction X functions as an annular groove 14 that reserves grease G. The annular groove 14 is constituted by an annular recessed part formed at the end of the outer ring 6 on the side near the grease reservoir member 4. The grease G for initial lubrication is filled in the annular groove 14 in advance. As shown in FIGS. 9 and 10, the grease reservoir member 4 includes an inner ring spacer 15 that is externally fitted to the main shaft 2, an outer ring spacer 16 that surrounds the inner ring spacer 15 to form annular space 17 between the outer ring spacer 16 and the inner ring spacer 15 and is internally fitted to the housing (not shown) of the machine tool, and an oil accommodation ring (a grease accommodation ring) 18 arranged in the annular space 17 between the inner ring spacer 15 and the outer ring spacer 16.

The inner ring spacer 15 is formed in a cylindrical shape that is in contact with the outer peripheral surface of the main shaft 2. As shown in FIG. 9, the inner ring spacer 15 externally fitted to the main shaft 2 is positioned with the end face thereof on one side in the axial direction X being in contact with the end face of the inner ring 5. The inner ring spacer 15 is positioned in a manner in which a cylindrical body having the inner ring 5 and the inner ring spacer 15 connected to each other is sandwiched between spacers K1 and K2 on both sides in the axial direction X. Each of the spacers K1 and K2 is fixed to the main shaft 2.

The outer ring spacer 16 is formed in a bottomed cylindrical shape that integrally includes a tubular peripheral wall 19 and an annular plate bottom wall 20 that extends from the peripheral edge of the peripheral wall 19 on one end in the axial direction to an inside in a radial direction. When the outer ring spacer 16 is externally fitted to the inner ring spacer 15 via the central opening of the bottom wall 20, the annular space 17, which is opened on the side thereof opposed to the rolling bearing 3 and sealed on the side opposite to the opposed side by the bottom wall 20, is defined between the outer ring spacer 16 and the inner ring spacer 15. Note that the "axial direction of the outer ring spacer 16" in the following description will indicate the axial direction of the peripheral wall 19 of the outer ring spacer 16 and correspond to the axial direction X of the main shaft 2 in the fourth embodiment.

In addition, as shown in FIG. 9, the outer ring spacer 16 is positioned with one-side end face thereof in the axial direction X being in contact with the end face of the outer ring 6. The outer ring spacer 16 is positioned by, for example, a positioning member (not shown) fixed to the housing (not shown). The oil accommodation ring 18 integrally includes a cylindrical part 21 arranged along an inner ring spacer 15 that forms the inner peripheral surface of the annular space 17, and an annular plate back-side flange part 22 and an annular plate supply-side flange part 33 that are arranged in the axial direction of the cylindrical part 21. Here, the annular plate back-side flange part 22 extends from the peripheral edge of the cylindrical part 21 on the side of the bottom wall 20 of the outer ring spacer 16 to an outside in a radial direction, and the annular plate supply-side flange part 33 extends from the peripheral edge of the cylindrical part 21 on the side opposite to the back-side flange part 22. By a peripheral wall 19 of the outer ring spacer 16 and the cylindrical part 21, the back-side flange part 22, and the supply-side flange part 33 constituting the oil accommodation ring 18, one annular grease reservoir 25 having an opening 24 opposed to a rolling bearing 3 is defined.

The supply-side flange part 33 of the oil accommodation ring 18 is located in the inner part of the rolling bearing 3, i.e., the part between an inner ring 5 and an outer ring 6, and is positioned at the inner area of an annular groove 14. The supply-side flange part 33 is formed to have a diameter smaller than that of the back-side flange part 22. Specifically, the back-side flange part 22 is formed to have a diameter to be substantially fitted into an annular space 17 such that the outer peripheral surface thereof is in contact with the peripheral wall 19 of the outer ring spacer 16 when the oil accommodation ring 18 is placed in the annular space 17. On the other hand, the supply-side flange part 33 has a diameter smaller than that of the back-side flange part 22. Thus, an annular gap is formed between the supply-side flange part 33 and the peripheral wall 19 of the outer ring spacer 16, and the annular gap forms the opening 24 as an example of the flow path according to the fourth embodiment of the invention that provides communication between the grease reservoir 25 and the inner part (the annular groove 14) of the rolling bearing 3.

As shown in FIG. 10, the grease reservoir 25 is partitioned into a plurality of accommodation chambers 41 (for example, six accommodation chambers 41 in FIG. 10) by a plurality of partition walls 40 (for example, six partition walls 40 in FIG. 10). The grease G is accommodated in each of the accommodation chambers 41. The plurality of partition walls 40 is arranged at given intervals in the circumferential direction of the outer ring spacer 16. For example, in FIG. 10, the six partition walls 40 are provided at intervals of 60 degrees in the circumferential direction of the outer ring spacer 16. Each of the partition walls 40 is arranged so as to extend in the axial direction of the outer ring spacer 16 and the radial direction of the outer ring spacer 16. Each of the partition walls 40 is formed separately from the grease reservoir member 4 (in other words, each of the partition walls 40 and the grease reservoir member 4 are separate members). Each of the partition walls 40 is made of, for example, steel. In addition, the shape of each of the partition walls 40 is not particularly limited. For example, each of the partition walls 40 may be formed in a flat plate shape as shown in FIG. 10, an elliptic cylinder shape, a triangular prism shape, or the like.

Each of the partition walls 40 is provided over an entire range from the opening 24 of the grease reservoir 25 to the back-side flange part 22 of the oil accommodation ring 18 in the axial direction of the outer ring spacer 16, and provided over an entire range from the cylindrical part 21 of the oil accommodation ring 18 to the peripheral wall 19 of the outer ring spacer 16 in the radial direction of the outer ring spacer 16. A back-side end 40A (see FIG. 11B) of each of the partition walls 40 is fitted and fixed to the back-side flange part 22 of the oil accommodation ring 18. The back-side flange part 22 has a plurality of fitting grooves 42 (for example, six fitting grooves 42) (see FIG. 11B) that is provided at intervals of 60 degrees in the circumferential direction of the outer ring spacer 16 to extend in the radial direction of the outer ring spacer 16, and the back-side ends 40A of the partition walls 40 are bonded and fixed to the fitting grooves 42 in a state of being fitted to the fitting grooves 42. Therefore, each of the partition walls 40 may be firmly provided at the grease reservoir 25.

In addition, the grease reservoir member 4 has openings 26 that successively extend through the bottom wall 20 of the outer ring spacer 16 and the back-side flange part 22 of the oil accommodation ring 18. In the fourth embodiment, the openings 26 include relatively large first openings 26L and second openings 26S smaller than the first openings 26L. The first openings 26L and the second openings 26S are formed at given intervals along the circumferential direction of the outer ring spacer 16. For example, each of the first openings 26L is formed to have a diameter substantially the same in size as the width of the grease reservoir 25 in the radial direction of the oil accommodation ring 18. Note that the first openings 26L and the second openings 26S may be alternately arranged as shown in FIG. 10, or a plurality of the first openings 26L may be arranged adjacent to each other, and a plurality of the second openings 26S may be arranged adjacent to each other.

The inner peripheral surface of each of the openings 26L and 26S is threaded. When bolts 27 are threadedly engaged with the screw threads, the oil accommodation ring 18 is fixed to the outer ring spacer 16. The grease G filled in the grease reservoir 25 and the annular groove 14 may contain a urea compound, a Ba complex soap, a Li complex soap, or the like as a thickening agent and contain an ester, a poly-alpha-olefin, or the like as a base oil. Since it is necessary to reserve the grease G in the grease reservoir 25 to supply the base oil to the rolling bearing 3 over a long time period, the grease G preferably has viscosity to some extent so as to reduce flow.

As shown in FIG. 10, in the grease G, first and second grooves 28 and 31 are formed so as to be adjacent to each of the partition walls 40. The first groove 28 is formed adjacent to one side (the clockwise side in FIG. 10) of each of the partition walls 40 in the circumferential direction of the outer ring spacer 16. While, the second groove 31 is formed adjacent to the other side (the counterclockwise side in FIG. 10) of each of the partition walls 40 in the circumferential direction of the outer ring spacer 16. That is, each of the partition walls 40 is sandwiched between the pair of the first and second grooves 28 and 31, and the pairs of the first and second grooves 28 and 31 are provided at six places at intervals of 60 degrees in the circumferential direction of the outer ring spacer 16. Each of the pairs of the first and second grooves 28 and 31 is arranged so as to be opposed to the corresponding first opening 26L.

Each of the first grooves 28 is an axial groove cut from the side (see FIG. 9) where the grease G is opposed to the opening 24 to the back side of the grease reservoir 25 along the axial direction of the outer ring spacer 16. Each of the first grooves 28 has a longitudinal direction along the radial direction of the outer ring spacer 16. That is, as shown in FIG. 10, each of the first grooves 28 has, when seen in the axial direction of the outer ring spacer 16, a relatively large length L along the radial direction from the central axis line to the outer periphery of the outer ring spacer 16 and a width W shorter than the length L along the circumferential direction about the central axis line of the outer ring spacer 16. Particularly, the length L is preferably larger than an opening width W2 in the radial direction of the opening 24 of the grease reservoir 25 when each of the first grooves 28 is overlapped with the supply-side flange part 33 (see FIG. 9) of the oil accommodation ring 18 in the radial direction of the outer ring spacer 16. More specifically, in the fourth embodiment, each of the first grooves 28 is formed over an entire range from the opening 24 of the grease reservoir 25 to the back-side flange part 22 of the oil accommodation ring 18 in the axial direction of the outer ring spacer 16 and formed over an entire range from the cylindrical part 21 of the oil accommodation ring 18 to the peripheral wall 19 of the outer ring spacer 16 in the radial direction of the outer ring spacer 16.

Each of the second grooves 31 is an axial groove cut from the side (see FIG. 9) where the grease G is opposed to the opening 24 to the back side of the grease reservoir 25 along the axial direction of the outer ring spacer 16. Each of the second grooves 31 has a longitudinal direction along the radial direction of the outer ring spacer 16. That is, as shown in FIG. 10, each of the second grooves 31 has, when seen in the axial direction of the outer ring spacer 16, a relatively large length L along the radial direction from the axis line to the outer periphery of the outer ring spacer 16 and a width W shorter than the length L along the circumferential direction about the axis line of the outer ring spacer 16. More specifically, in the fourth embodiment, each of the second grooves 31 is formed over the entire range from the opening 24 of the grease reservoir 25 to the back-side flange part 22 of the oil accommodation ring 18 in the axial direction of the outer ring spacer 16 and formed over the entire range from the cylindrical part 21 of the oil accommodation ring 18 to the peripheral wall 19 of the outer ring spacer 16 in the radial direction of the outer ring spacer 16. Note that FIG. 10 shows a case in which the width of the second groove 31 is equivalent to that of the first groove 28. However, the width of the second groove 31 may be different from that of the first groove 28.

As described above, the grease reservoir 25 is divided into the plurality of accommodation chambers 41 (for example, the six accommodation chambers 41), and the grease G is accommodated in each of the accommodation chambers 41. Therefore, the grease G is divided (partitioned) by the plurality of partition walls 40. The first and second grooves 28 and 31 are formed adjacent to each of the partition walls 40, and formed over the entire ranges in both the axial and radial directions of the outer ring spacer 16. Therefore, it can be said that the grease G is divided not only by the partition walls 40 but also by the first and second grooves 28 and 31. In addition, it can also be said that the configuration in which each of the partition walls 40 is sandwiched between the first and second grooves 28 and 31 described above is equivalent to a configuration in which each of the partition walls 40 is provided between the first and second grooves 28 and 31 that divide the grease G.

Thus, the grease G is divided by the first and second grooves 28 and 31 and the partition walls 40 into a plurality of sections 29 (six sections in FIG. 10) along the circumferential direction of the outer ring spacer 16. The grease G accommodated in each of the accommodation chambers 41 corresponds to each of the sections 29. An end face 35 at one end of each of the sections 29 of the grease G in the circumferential direction of the outer ring spacer 16 (the surface of the grease G that is formed by the second groove 31, and that will be expressed as the "one-side end face 35" below) is exposed to the second groove 31 in a state in which the area of the end face 35 is larger than the area of a portion of the section 29 of the grease G, the portion being opposed to the opening 24 (the portion being exposed through the opening 24). In addition, an end face 32 at the other end of each of the sections 29 of the grease G in the circumferential direction of the outer ring spacer 16 (the surface of the grease G that is formed by the first groove 28, and that will be expressed as the "other-side end face 32" below) is exposed to the first groove 28 in a state in which the area of the end face 32 is larger than the area of a portion of the section 29 of the grease G, the portion being opposed to the opening 24 (the portion being exposed through the opening 24).

Figure 11A:
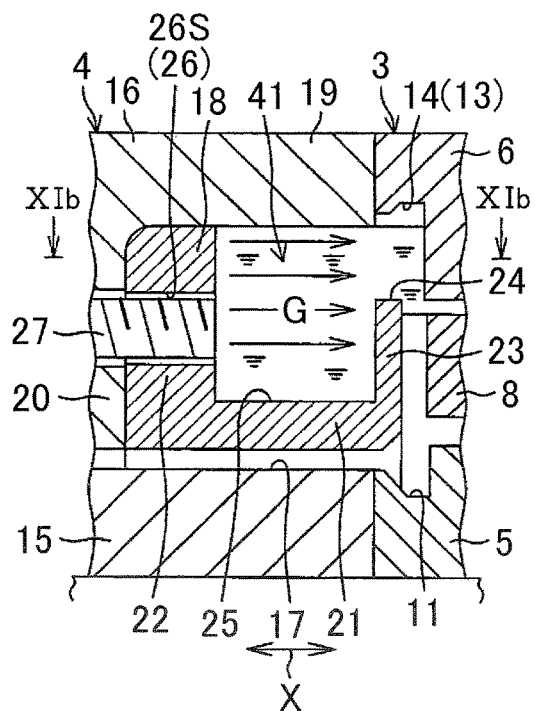
FIGS. 11A and 11B are views for describing the flow of a base oil contained in grease.
Figure 11B:
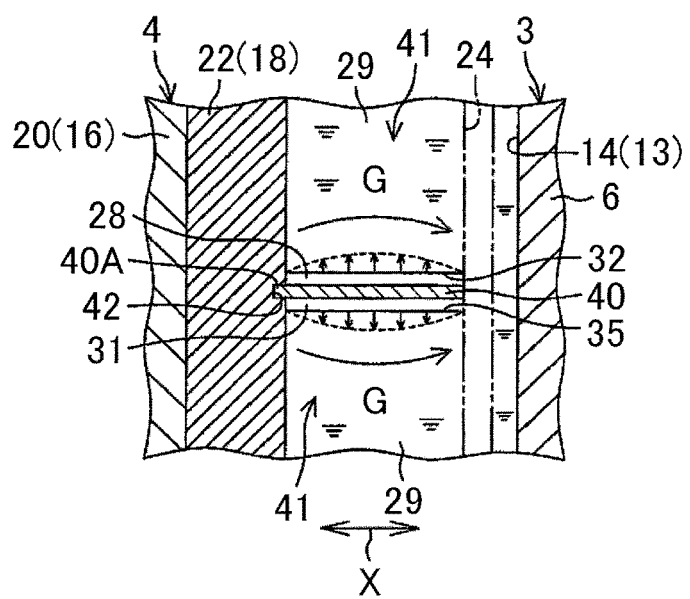

FIGS. 11A and 11B are views for describing the flow of the base oil contained in the grease G. FIG. 11A is an enlarged sectional view of the main part of FIG. 9, and FIG. 11B is a sectional view of the rolling bearing device 1 taken along line XIb-XIb in FIG. 11A. Next, a description will be given of the flow of the base oil of the grease G filled in the grease reservoir 25. As shown in FIGS. 11A and 11B, in the rolling bearing device 1, the grease G for initial lubrication is filled in the annular groove 14 of the rolling bearing 3 while the grease G for replenishment is filled in the grease reservoir 25. The grease G in the annular groove 14 and the grease G in the grease reservoir 25 are in contact with each other. Therefore, when the base oil of the grease G in the annular groove 14 is consumed with the operation of the rolling bearing 3, the base oil of the grease G reserved in the grease reservoir 25 moves into the rolling bearing 3.

On this occasion, in the grease G in the grease reservoir 25, the first and second grooves 28 and 31 are formed. In addition, since the one-side end face 35 of the grease G is exposed to the second groove 31, and the other-side end face 32 thereof is exposed to the first groove 28, the base oil of the grease G is preferentially supplied from the one-side end face 35 and the other-side end face 32 before being supplied from the area where the grease G is opposed to the opening 24. Thus, the base oil is consumed from the one-side end face 35 and the other-side end face 32 of the grease G, and each of the one-side end face 35 and the other-side end face 32 is recessed. As a result, the first groove 28 is expanded to one side in the circumferential direction of the outer ring spacer 16 (the clockwise direction in FIG. 10, i.e., the upward direction in FIG. 11B), while the second groove 31 is expanded to the other side in the circumferential direction of the outer ring spacer 16 (the counterclockwise direction in FIG. 10, i.e., the downward direction in FIG. 11B) (see FIG. 11B). By the expansion, the base oil is caused to flow, as indicated by solid arrows in FIGS. 11A and 11B, in the axial direction X of the outer ring spacer 16 from the back side to the opening 24 of the grease reservoir 25. As a result, the base oil of the grease G on the back side of the grease reservoir 25 can be effectively used, and the base oil can be sequentially supplied to the rolling bearing 3 (the annular groove 14).

In addition, the adjacent sections 29 are separated by the partition wall 40. Therefore, even if vibrations or the like caused by the rotation of the rolling bearing 3 act on the grease reservoir 25, the adjacent sections 29 can be prevented from being connected to each other and the grooves 28 and 31 can be prevented from disappearing. Thus, the exposed states of the end faces 35 and 32 of the sections 29 can be maintained over a long time period.

Moreover, the adjacent sections 29 are physically separated from each other by the groove 28. Therefore, even if the breakage of the grease occurs in one of the sections 29, the diffusion of the breakage of the grease is ended by the groove 28 between the section 29 where the breakage of the grease occurs and the other section 29. Thus, the breakage of the grease can be stopped at the section 29. As a result, the sections 29 on both sides of the section 29 involved are not influenced by the breakage of the grease and the base oil of the grease G can be continuously supplied. Therefore, it is possible to reduce the occurrence of the breakage of the grease G along the circumferential direction of the outer ring spacer 16. In addition, even if the breakage of the grease G occurs, the base oil can be prevented from being depleted near the rolling bearing 3.

As described above, the base oil of the grease G can be continuously supplied to the rolling bearing 3 over a long time period, which makes it possible to maintain the lubrication performance for the rolling bearing 3 over a longer time period. In addition, since it is only necessary to provide the partition walls 40 in the grease reservoir 25 and to form the first and second grooves 28 and 31 in the grease G in the grease reservoir 25, the structure of the rolling bearing device 1 can be prevented from becoming complicated.

Moreover, in the fourth embodiment, the first and second grooves 28 and 31 are formed over the entire range from the opening 24 of the grease reservoir 25 to the back-side flange part 22 of the oil accommodation ring 18 in the axial direction of the outer ring spacer 16 (see FIG. 11B), and formed over the entire range from the cylindrical part 21 of the oil accommodation ring 18 to the peripheral wall 19 of the outer ring spacer 16 in the radial direction of the outer ring spacer 16 (see FIG. 10). Thus, the surface area of the one-side end face 35 of the grease G can be maximized in the grease reservoir 25 that has limited size. Therefore, the base oil may be caused to efficiently flow in the axial direction X of the outer ring spacer 16 from the back side to the opening 24 of the grease reservoir 25.

In addition, the plurality of first and second grooves 28 and 31 and the plurality of partition walls 40 are provided. By this configuration, the sum of the surface areas of the one-side end faces 35 of the grease G and the sum of the surface areas of the other-side end faces 32 of the grease G can be increased. Therefore, the base oil can be caused to efficiently flow in the axial direction X of the outer ring spacer 16 from the back side to the opening 24 of the grease reservoir 25.

Figure 12A:
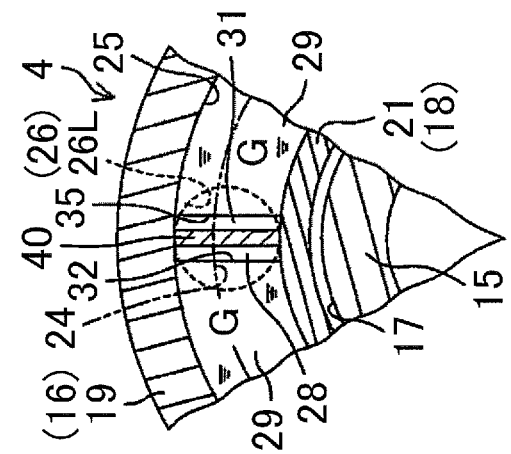
FIGS. 12A to 12C are sectional views of the rolling bearing device for describing the processes of forming grooves shown in FIG. 10 in the order in which the grooves are formed.
Figure 12B:
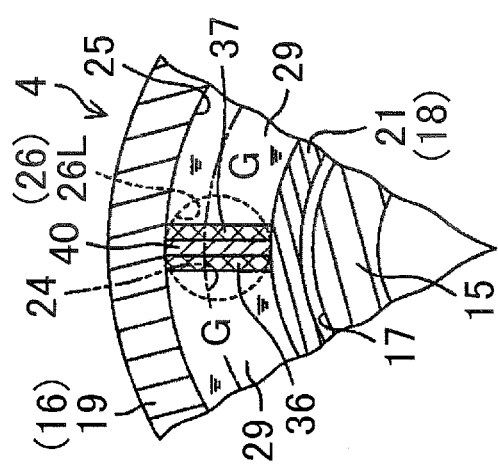
Figure 12C:
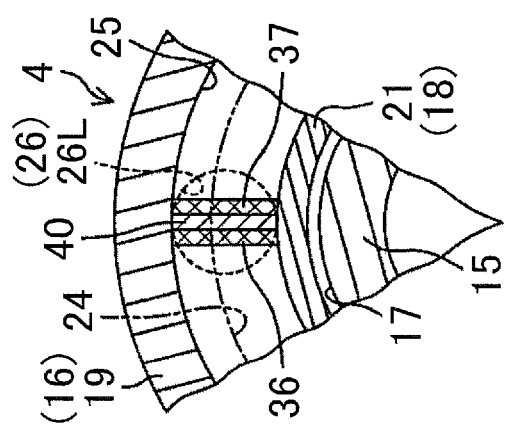

FIGS. 12A to 12C are sectional views of the rolling bearing device 1 for describing the processes of forming the grooves 28 and 31 of the grease G shown in FIG. 9 in the order in which the grooves 28 and 31 are formed. The above grooves 28 and 31 of the grease G may be formed by, for example, the processes shown in FIGS. 12A to 12C. Specifically, first, the inner ring spacer 15, the outer ring spacer 16, 16, and the oil accommodation ring 18 are fitted to each other to assemble the grease reservoir member 4. Then, as shown in FIG. 12A, first and second spacers 36 and 37 (an example of the grease spacer according to the invention) are inserted in the grease reservoir 25 at positions on respective sides of each partition wall 40 in the circumferential direction of the outer ring spacer 16, from the back-face side of the outer ring spacer 16 (the side opposite to the grease reservoir 25) via the opening 26 (for example, the first opening 26L). The first spacer 36 is formed in the same shape as that of the first groove 28 designed in advance. The second spacer 37 is formed in the same shape as that of the second groove 31 designed in advance.

Next, as shown in FIG. 12B, the grease G is filled in each of the accommodation chambers 41 of the grease reservoir 25 via the opening 24. On this occasion, the grease G is filled so as to avoid the partition walls 40 and the first and second spacers 36 and 37. Then, as shown in FIG. 12C, the first and second spacers 36 and 37 are extracted to the back-face side of the outer ring spacer 16 via the opening 26 used for the insertion. Thus, in the grease reservoir 25, the first grooves 28 are formed at the positions at which the first spacers 36 have been arranged, and the second grooves 31 are formed at the positions at which the second spacers 37 have been arranged. The first and second spacers 36, 37 may remain disposed in the grease reservoir 25, for example, until the rolling bearing device is disposed in a machine tool or the like. In this case, the first and second grooves 28, 31 are formed when the first and second spacers 36, 37 are extracted.

Figure 13:
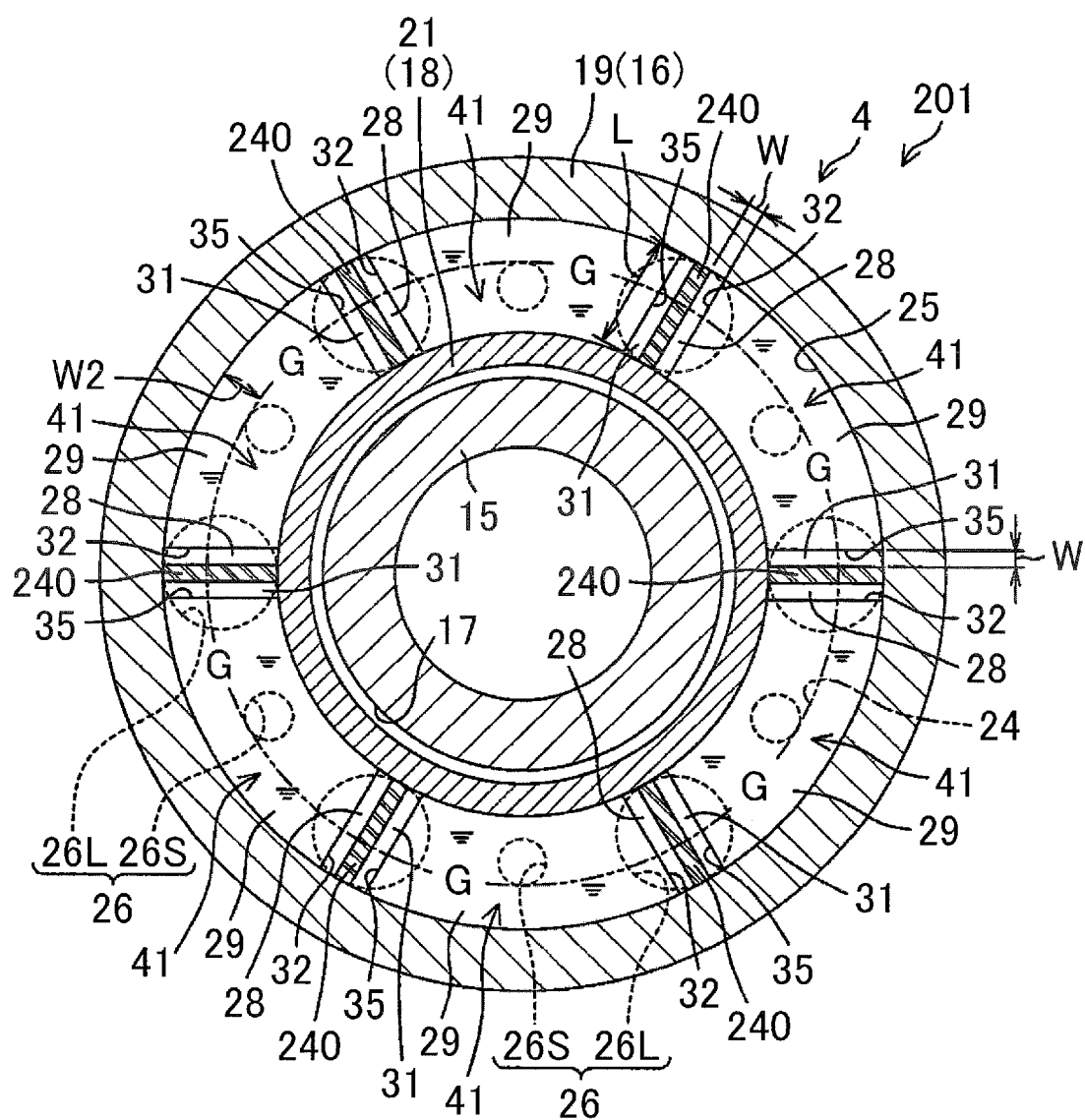
FIG. 13 is a sectional view of a rolling bearing device according to a fifth embodiment of the invention.
Figure 14A:
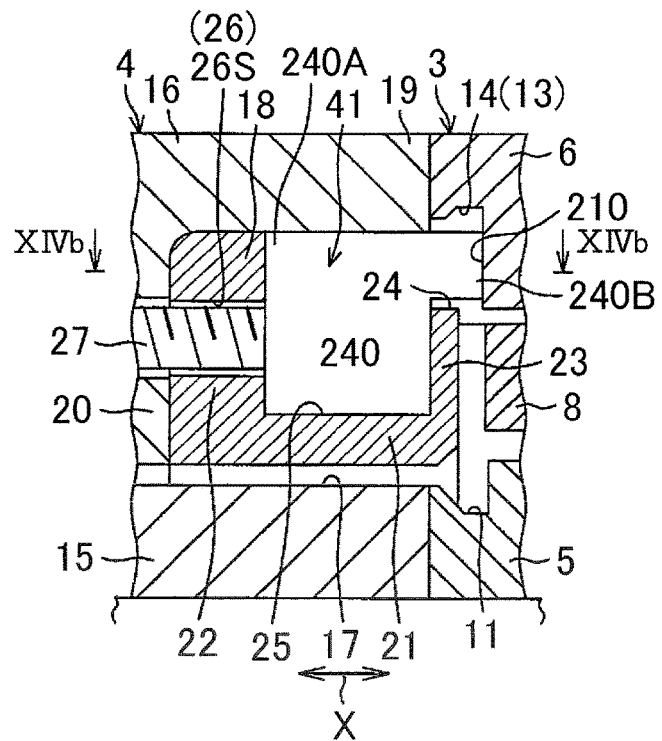
FIGS. 14A and 14B are views for describing the flow of a base oil contained grease.
Figure 14B:
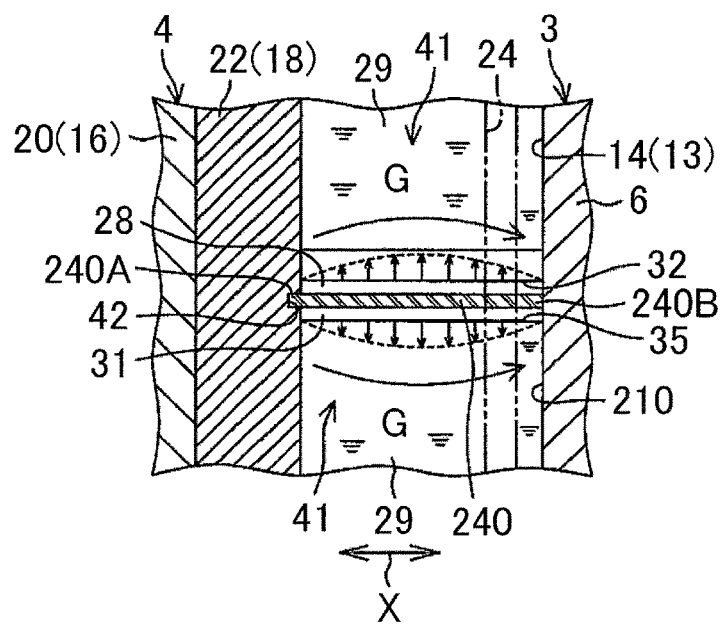

As described above, the first and second grooves 28 and 31 can be formed only by a simple operation of inserting/extracting the first and second spacers 36 and 37 in/from the grease reservoir 25. FIG. 13 is a sectional view of a rolling bearing device 201 according to a fifth embodiment of the invention. FIGS. 14A and 14B are views for describing the flow of a base oil contained in grease G. FIG. 14A is an enlarged sectional view, and FIG. 14B is a sectional view of the rolling bearing device taken along line XIVb-XIVb in FIG. 14A.

In the fifth embodiment, parts corresponding to the respective parts described in the fourth embodiment will be denoted by the same reference numerals and symbols as those of FIG. 9 to FIGS. 12A to 12C, and their descriptions will be omitted. The fifth embodiment is different from the fourth embodiment in that partition walls 240 made of a porous material are provided instead of the partition walls 40 made of steel. Hereinafter, a description will be mainly given, with reference to FIG. 13 and FIGS. 14A and 14B, of the difference between the partition walls 240 and 40.

The porous material include, for example, a urethane resin, a polyethylene resin, an acrylic resin, and silicon. In addition, the porous material may include a sintered material. By the capillary action of the porous material, the base oil may penetrate the partition walls 240. Therefore, in a state in which the grease G is accommodated in a grease reservoir 25 (accommodation chambers 41), the base oil contained in the grease G penetrates the partition walls 240.

Like the partition wall 40, each of the partition walls 240 is provided over an entire range in the axial direction of an outer ring spacer 16 and provided over an entire range in the radial direction of the outer ring spacer 16. However, unlike the partition wall 40, the outer peripheral part of the partition wall 240 protrudes in the axial direction of the outer ring spacer 16. A protrusion part of the partition wall 240 extends to a rolling bearing 3 via an opening 24 of the grease reservoir 25 in the axial direction of the outer ring spacer 16, and an end 240B of the partition wall 240 on the near side (on the side near the opening 24) is in contact with a stepped part 210 of an outer ring 6 that defines an annular groove 14. The stepped part 210 is continuous with an outer ring raceway surface 12. A back-side end 240A (see FIG. 14B) of the partition wall 240 is fitted and fixed to the back-side flange part 22 of the oil accommodation ring 18.

In addition, as will be described below, first and second grooves 28 and 31 according to the fifth embodiment are formed when the base oil contained in the grease G around the partition wall 240 is absorbed in the partition wall 240. Therefore, the first and second grooves 28 and 31 are equivalent in shape and size to the partition wall 240 in the axial direction and the radial direction of the outer ring spacer 16. Since the base oil contained in the grease G penetrates the end 240B of the partition wall 240 on the near side, and the end 240B is in contact with the stepped part 210, the base oil is supplied to the stepped part 210 of the outer ring 6 via the partition wall 240. The base oil that penetrates the partition wall 240 is free from the occurrence of the breakage of the grease. Therefore, even if the breakage occurs in the grease G in the grease reservoir 25, the base oil contained in the grease G can be continuously supplied to the outer ring 6. Thus, the base oil contained in the grease G can be continuously supplied to the rolling bearing 3 over a longer time period by the rolling bearing 3.

FIGS. 15A and 15B are sectional views of the rolling bearing device 1 for describing the processes of forming the grooves 28 and 31 of the grease G shown in FIG. 13 in the order in which the grooves 28 and 31 are formed. The above grooves 28 and 31 of the grease G can be formed by, for example, the processes shown in FIGS. 15A and 15B. Specifically, first, the inner ring spacer 15, the outer ring spacer 16, and the oil accommodation ring 18 are fitted to each other to assemble the grease reservoir member 4. Then, as shown in FIG. 15A, the grease G is filled in each of the accommodation chambers 41 of the grease reservoir 25 via the opening 24. On this occasion, the grease G is filled so as to avoid the partition walls 240. The grease G is left in its stationary state. Since the partition walls 240 are made of a porous material, the base oil can be absorbed in the partition walls 240 by the capillary action of the porous material.

Accordingly, the base oil contained in the grease G around the partition walls 240 is absorbed in the partition walls 240 with time, and the first and second grooves 28 and 31 are respectively formed on both sides of each partition wall 240 in the circumferential direction of the outer ring spacer 16 as shown in FIG. 15B. As described above, the first and second grooves 28 and 31 can be formed only by an extremely simple operation without any jig, i.e., by filling the grease G in each of the accommodation chambers 41.

The fourth and fifth embodiments of the invention are described above, but the invention may be carried out in other modes. For example, each of the fourth and fifth embodiments describes the case in which the grooves 28 and 31 are respectively formed on both sides of each partition wall 40 or 240 in the circumferential direction of the outer ring spacer 16. However, the grooves 28 and 31 may be formed only one of both sides of each partition wall 40 or 240 in the circumferential direction.

In addition, the first and second grooves 28 and 31 may not be provided between the grease G and the partition walls 40 or 240. Moreover, each of the fourth and fifth embodiments describes the case in which each of the grooves 28 and 31 is formed over the entire range from the opening 24 of the grease reservoir 25 to the back-side flange part 22 of the oil accommodation ring 18 in the axial direction of the outer ring spacer 16 and provided over the entire range from the cylindrical part 21 of the oil accommodation ring 18 to the peripheral wall 19 of the outer ring spacer 16 in the radial direction of the outer ring spacer 16. However, each of the grooves 28 and 31 may be formed over the entire range in the axial direction of the outer ring spacer 16 while being formed only at a part (for example, a part up to an intermediate position in an area from the peripheral wall 19 of the outer ring spacer 16 to the cylindrical part 21 of the oil accommodation ring 18 such that there is a space between each of the grooves 28 and 31 and the cylindrical part 21 of the oil accommodation ring 18) in the radial direction of the outer ring spacer 16. In addition, each of the grooves 28 and 31 may be formed over the entire range in the radial direction of the outer ring spacer 16 while being formed only at a part (for example, a part up to an intermediate position in an area from the opening 24 of the grease reservoir 25 to the back-side flange part 22 of the oil accommodation ring 18 such that there is a space between each of the grooves 28 and 31 and the back-side flange part 22 of the oil accommodation ring 18) in the axial direction of the outer ring spacer 16.

Further, each of the fourth and fifth embodiments describes the case in which the partition walls 40 or 240 are fitted and fixed to the back-side flange part 22 of the oil accommodation ring 18. However, the partition walls 40 or 240 may be fitted and fixed to the cylindrical part 21 or the supply-side flange part 33 of the oil accommodation ring 18. Furthermore, each of the fourth and fifth embodiments describes the case in which the partition walls 40 or 240 are fitted and fixed to the grease reservoir member 4 including the oil accommodation ring 18. However, the partition walls 40 or 240 may be fixed to the grease reservoir member by other fixation methods such as welding.

Furthermore, each of the fourth and fifth embodiments describes the case in which each of the inner ring 5 and the inner ring spacer 15 serves as a rotation side that rotates together with the main shaft 2 while each of the outer ring 6 and the outer ring spacer 16 serves as a stationary side that is in a stationary state of being fixed to the housing (not shown). However, the invention of this application may also be applied to a case in which each of the outer ring 6 and the outer ring spacer 16 serves as a rotation side while each of the inner ring 5 and the inner ring spacer 15 serves as a stationary side.

Besides, it is possible to add various modifications within the scope of the invention.

What is claimed is:

1. A rolling bearing device comprising:
    a rolling bearing including an inner ring, an outer ring, and a plurality of rolling elements arranged between the inner ring and the outer ring; and
    a spacer provided adjacent to one side of the rolling bearing in an axial direction and having a grease reservoir and a flow path, the grease reservoir being in a form of a groove, extending along a circumferential direction, and having grease reserved in the grease reservoir, and the flow path providing communication between the grease reservoir and an inner part of the rolling bearing, wherein
    the spacer includes an annular wall surface that defines an inner periphery of the grease reservoir,
    an end of the annular wall surface on a side of the rolling bearing in the axial direction of the grease reservoir is continuous with and directly connected to an opposed end face of the spacer that is opposed nearer to the rolling bearing,
    an entire area of the annular wall surface is constituted by only one flat surface,
    a smallest length of the grease reservoir in the axial direction is larger than a largest length of the grease reservoir in a radial direction, and
    the roller bearing further includes a cage, and a diameter of an inner peripheral surface of the grease reservoir at a position closer to the roller bearing in the axial direction of the spacer is larger than a diameter of an outer peripheral surface of the cage.

2. The rolling bearing device according to claim 1, wherein
    the annular wall surface includes a cylindrical surface about an axis line of the spacer.

3. The rolling bearing device according to claim 1, wherein
    the annular wall surface includes a conical surface about an axis line of the spacer, a diameter of the conical surface being reduced gradually toward the rolling bearing.

4. The rolling bearing device according to claim 1, wherein
    the inner periphery of the grease reservoir has a linear shape in a sectional view of the spacer in the axial direction, and
    a radial-size of the grease reservoir on the side of the rolling bearing in the axial direction of the spacer is same as or larger than a radial-size of the grease reservoir on a side opposite to the rolling bearing in the axial direction of the spacer.

5. The rolling bearing device according to claim 1, wherein
    inner wall surfaces that define the grease reservoir are subjected to non-viscous surface treatment.

6. The rolling bearing device according to claim 5, wherein
    the inner wall surfaces include a back-side wall surface that is located on a back side when seen from the flow path.

7. The rolling bearing device according to claim 5, wherein the non-viscous surface treatment includes treatment in which one of a fluorine-based non-viscous resin layer and a silicon-based non-viscous resin layer is disposed on the inner wall surfaces.

8. The rolling bearing device according to claim 5, wherein
the non-viscous surface treatment is treatment in which the inner wall surfaces are coated with a predetermined kind of oil immiscible with a base oil of the grease.

* * * * *